April 11, 1961 B. BRIGHTMAN 2,979,570

TIME DIVISION MULTIPLEX COMMUNICATION SYSTEM

Filed Aug. 31, 1959 18 Sheets-Sheet 1

INVENTOR.
BARRIE BRIGHTMAN
BY F. H. Henson
ATTORNEY

April 11, 1961 B. BRIGHTMAN 2,979,570

TIME DIVISION MULTIPLEX COMMUNICATION SYSTEM

Filed Aug. 31, 1959 18 Sheets-Sheet 3

April 11, 1961 B. BRIGHTMAN 2,979,570

TIME DIVISION MULTIPLEX COMMUNICATION SYSTEM

Filed Aug. 31, 1959 18 Sheets-Sheet 4

AUDIO AMPLIFIER-AUA

BLOCKING OSCILLATOR GATE-BOG

EMITTER FOLLOWER-EFB

EMITTER FOLLOWER-EFE

EMITTER FOLLOWER-EFJ

April 11, 1961 B. BRIGHTMAN 2,979,570

TIME DIVISION MULTIPLEX COMMUNICATION SYSTEM

Filed Aug. 31, 1959 18 Sheets-Sheet 7

GATE-GGA

GATE-GJD

INVERTER-INA

INVERTER-INC

HIGH SPEED INVERTER-ING

INVERTER-INS

INVERTER-INU

MONOSTABLE MULTIVIBRATOR-MAA

LOW PASS FILTER-FLN

April 11, 1961 B. BRIGHTMAN 2,979,570

TIME DIVISION MULTIPLEX COMMUNICATION SYSTEM

Filed Aug. 31, 1959 18 Sheets-Sheet 9

LINK CIRCUIT

LINK CIRCUIT

TONE GENERATOR (RELEASE, BUSY OR RINGING)

READ OFF CIRCUIT

DETECTOR CIRCUIT (RING TRIP OR RELEASE)

DETECTOR CIRCUIT (RING TRIP OR RELEASE)

TIME DIVISION MULTIPLEX COMMUNICATION SYSTEM

Filed Aug. 31, 1959 18 Sheets-Sheet 18

2,979,570
Patented Apr. 11, 1961

2,979,570

TIME DIVISION MULTIPLEX COMMUNICATION SYSTEM

Barrie Brightman, Rochester, N.Y., assignor to General Dynamics Corporation, Rochester, N.Y., a corporation of Delaware Filed Aug. 31, 1959, Ser. No. 837,061
15 Claims. (Cl. 179—15)

This invention relates in general to communication systems and, more particularly, to communication systems of the time division multiplex type.

In communication systems of the type shown in copending application Serial Number 814,926, filed May 21, 1959, and assigned to the same assignee as the present invention, the lines of the system are interconnected by transmission networks, or highways, of the time position channel type. In the system disclosed in the above-identified copending application, each of the transmission networks comprises thirty-two time position channels and an individual channel is permanently assigned to each line of the system. Connections are completed between calling and called lines, which may have time positions on the same or different transmission networks assigned thereto, by link circuits common to the lines of the system. Each link circuit comprises a relay per transmission network for controlling connection to the transmission network assigned to the calling line and a relay per transmission network for controlling connection to the transmission network assigned to the called line in addition to calling and called gates for controlling connection to the time position channels assigned to the calling and called lines, respectively.

It is, of course, desirable to reduce the number of transmission networks required for a given number of lines so as to reduce the amount of equipment required to establish connections between the lines. The only way that this can be accomplished as a practical matter is to increase the channel capacity of each transmission network by reducing the width of each channel since the duration of each channel frame is controlled by the fact that each line must be sampled at 8 kc. or greater for accurate reproduction of the sampled signals. In the system disclosed in the above-identified application, each channel is 1.25 microseconds in width and a guard time of 1.25 microseconds is provided between channels so that the master oscillator, which controls the development of the time position defining pulses, must have a frequency of 400 kc. Now, if the channel capacity of each transmission network is increased to 200, for example, each channel is .25 microsecond in width, and the guard time between channels is .25 microsecond in width, the master oscillator must have a frequency of two megacycles. When frequencies and pulse widths of the latter order are used, the wire length and the stray capacitance in the wiring required to distribute the pulses to the units terminating the lines become extremely critical because of the nonuniform pulse delays introduced throughout the system.

Accordingly, it is the general object of this invention to provide a new and improved communication system of the time division multiplex type.

It is a more particular object of this invention to provide a new and improved communication system of the time division multiplex type having increased channel capacity over systems of the prior art.

Briefly, the present invention accomplishes the above cited objects by providing a communication system in which high speed multiplexing is confined to a small number of gates concentrated within a small physical area. In accordance with the invention, the lines of the system are divided into groups and subgroups with a line gate, a subgroup gate, a group gate, and a master gate being interposed in an individual connection between each line and the transmission network. The master gate is operated during each time position channel, the group gates are operated in succession during succeeding operations of the master gate, the subgroup gates for each group of lines are operated at a submultiple of the frequency of operation of the group gate for that group of lines, and the line gates for each subgroup of lines are operated at a submultiple of the frequency of operation of the subgroup gate for that subgroup of lines. Thus, the channels of said network are assigned successively to the groups of lines, the channels assigned to each group of lines are assigned successively to the subgroups of lines in that group of lines, and the channels assigned to each subgroup of lines are assigned successively to the lines in that subgroup of lines.

Particular advantages of the above-described grouping method are realized when the system is of the resonant transfer type, as illustrated. First, a common send low-pass filter can be provided for each subgroup of lines since the lines of each subgroup are connected in turn to the filter for that subgroup of lines with one line being connected during the period of time between successive operations of the subgroup gate for that subgroup of lines, and, second, the master gate can be controlled to have a shorter operated time than any of the other gates and thus be the only gate in the system which has a precise requirement as to operated time since it controls the time interval during which energy is transferred between a line and the transmission network.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise twenty-seven figures on eighteen sheets.

Fig. 1 shows the trunking diagram of the disclosed telephone system,

Figs. 2A–2D, when arranged in order from left to right, show a long distance switching center in block diagram form, Figs. 3A–18B show the logic symbols, together with a typical circuit represented by each symbol, which are used throughout the detailed circuit drawings, Figs. 19A–19C, when arranged in order from left to right, show the voice path or communication connection between the lines and the transmission network of a long distance switching center, Figs. 20 and 21, when arranged with Fig. 21 to the right of Fig. 20, show a link circuit for use in a long distance switching center, Fig. 22 shows a tone generator for use in a long distance switching center, Fig. 23 shows a read-off circuit for use in a long distance switching center, Figs. 24 and 25, when arranged with Fig. 25 to the right of Fig. 24, show a detector circuit for use in a long distance switching center, and Figs. 26 and 27, when arranged with Fig. 27 to the right of Fig. 26, show graphic illustrations of the pulses used to control the multiplexing in a long distance switching center.

The general operation of the system in which the invention has been disclosed can best be understood by reference to Figs. 2A–2D, inclusive, in conjunction with reference to the trunking diagram shown in Fig. 1. The block diagram of Figs. 2A–2D represents a part of the equipment comprising each of the long distance switching centers 2, 5 and 8 of Fig. 1. Details of the equipment comprising each of the local offices of Fig. 1 are disclosed in copending application Serial Number 814,928, filed May 21, 1959, and assigned to the same assignee as the present invention. The lines interconnecting the subscriber stations and the local offices and the lines interconnecting the various offices are four-wire and may be either physical wire or radio links. Further, all signaling in the system is of the voice frequency type.

As shown in Fig. 1, calls between subscribers in different local offices may be routed through one or more long distance switching centers. For example, a call from subscriber station A in local office 1 to subscriber station B in local office 9 is routed through long distance switching centers 2, 5 and 8. The call is initiated by the transmission of a seize signal from station A when the handset at that station is removed from its cradle. Upon receipt of dial tone from local office 1, the transmission of a seize signal by station A is terminated and the subscriber at station A then proceeds to key the routing digits required to select subscriber station B. The keyed number comprises routing digits corresponding to long distance switching centers 2, 5 and 8, an arbitrary digit, which may be the digit "1," identifying local, the digit corresponding to local office 9, and the three digit directory number of station B in local office 9. The first keyed digit controls the equipment in local office 1 to select an idle trunk line to long distance switching center 2 and to transmit a seize signal over the selected trunk line. In switching center 2, the receipt of a seize signal over a trunk line from a local office controls an idle direct dialing register in that center to connect to the trunk line over which the seize signal is received and the second and all succeeding digits received from station A are stored in the direct dialing register taken into use. The second digit is utilized to control common equipment in switching center 2 to select an idle trunk line to switching center 5, the direct dialing register taken into use is then controlled to connect to the selected trunk line and to transmit a seize signal over the trunk line to switching center 5.

In switching center 5, the receipt of a seize signal over a trunk line from another long distance switching center controls an idle incoming register in that switching center to connect to the trunk line over which the seize signal is received and to transmit a seize acknowledge signal back over that trunk line to the controlling direct dialing register in switching center 2. The incoming register has not been shown in the block diagram of Figs. 2A–2D of this application since it is not necessary to the understanding of the present invention. Upon receipt of the seize acknowledge signal, the controlling direct dialing register terminates the transmission of a seize signal and then transmits the third digit, which corresponds to switching center 8, to the incoming register in switching center 5. The third digit is stored in the incoming register in switching center 5 and an acknowledge signal representing that digit is returned to the controlling direct dialing register. The direct dialing register then transmits a second seize signal, incoming register in switching center 5 then controls the common equipment in that office to select an idle trunk line to switching center 8, a connection is established between the calling and called trunk lines in switching center 5, and the incoming register in switching center 5 is then released for use on another call. The seize signal transmitted by the controlling direct dialing register, and which controlled the equipment in switching center 5 to route the call through that center, is then detected in switching center 8 and an idle incoming register in that switching center is connected to the calling trunk line in that switching center. The action in switching center 8 is identical to that just described in switching center 5 with the exception that the first digit "1" transmitted to switching center 8 controls the incoming register to delay until two digits have been received before switching the call through to an idle trunk line extending to local office 9. Thus, it can be seen that the extension of a call is controlled by the direct dialing register and the first switching center encountered, the intermediate switching centers are controlled by a single digit to select an idle trunk line to the next switching center, and the final long distance switching center is controlled by two digits to select the desired local office. When the seize signal which controls the equipment in switching center 8 to route the call through that center to local office 9 is detected in local office 9 and a subscriber register is connected to the trunk line over which the seize signal is received, dial tone is returned over the extended connection to the controlling direct dialing register to indicate to said register that the call has progressed to a local office. The controlling direct dialing register is responsive to the receipt of dial tone to transmit an interlock request signal to local office 9 over the extended connection.

The subscriber register in local office 9 is responsive to the receipt of an interlock request signal to transmit a seize acknowledge signal to the controlling direct dialing register, and the three digits of the directory number of station B are then transmitted and acknowledged in turn. At the completion of the transmission of the directory number to local office 9, an end of call signal is transmitted from office 9 to the controlling direct dialing register regardless of the idle or busy condition of the selected called line. The end of call signal controls the equipment in long distance switching center 2 to connect the calling and called trunk lines in that office together and the direct dialing register used on the call is then released from the connection and freed for use on another call. A connection is now completed between station A and local office 9 so that the ringback tone, or busy tone, transmitted from office 9 may be heard by the calling subscriber at station A.

Each of the long distance switching centers is also equipped with one or more service lines which may be reached through the direct dialing register provided in that switching center.

The block diagram of the long distance switching center, which is shown in Figs. 2A–2D, will now be described in more detail. Although just four line terminating units, namely, units 21–24, have been shown, it is to be understood that there is provided a line terminating unit for each trunk line terminating in the exchange and a line terminating unit for each service line in the exchange.

As illustrated, the line terminating units, the direct dialing registers, the route selector, and the link circuits are interconnected by a highway transmission network of the four-wire type which comprises two hundred time division channels. As illustrated, the lines of the system are divided into two one hundred line groups, and the groups of lines are each subdivided into ten ten-line subgroups. For example, illustrated line terminating unit 21 terminates the first line in the first subgroup of the first group, unit 22 terminates the tenth line in that subgroup, unit 23 terminates the first line in the tenth subgroup of the first group, and unit 24 terminates the tenth line in that subgroup. A master gate, which comprises receive gate 25A and send gate 25B, a group gate such as the group gate for group 1, which comprises group 1 receive gate 26A and group 1 send gate 26B, a subgroup gate such as the gate for group 1 subgroup 1, which comprises group 1 subgroup 1 receive gate 27A and group 1 subgroup 1 send gate and filter 27B, and a line gate, which is included in each line terminating unit, are interposed in an individual connection between each line and the transmission network. Thus, the line terminated by line terminating unit 21 is connected to the transmission network conductors send and receive during the time interval in each time position frame when gates 25, 26, 27 and the line gate in unit 21 are simultaneously operated or closed. The multiplexing is controlled by the pulses generated by square wave generator 28, which may be of any well known type. Since the waveform generated by generator 28 is a square wave having a frequency of two megacycles, the negative and positive going pulses produced by said generator are each .25 microsecond in duration and, since there are two hundred channels on the transmission network, each pulse frame is one hundred microseconds in duration and the lines are sampled at a 10 kc. rate. The master receive and send gates 25A and 25B are triggered by the leading edge of each negative-going pulse received from generator 28. Since the lines are divided into two groups in the illustrated system, the negative pulses received from generator 28 are commutated to the two group gate control conductors G1G and G2G and the positive pulses received from generator 28 are commutated to the two group distributor control conductors G1D and G2D by group pulse commutator 29, which may be of any well known type. The group 1 receive and send gates 26A and 26B are triggered by the leading edge of each negative pulse appearing on conductor G1G and are thus operated or closed at a one megacycle rate.

The group 1 subgroup distributor 30 comprises a ten-stage ring counter of any well known type and is stepped by the trailing edge of each positive-going pulse appearing on conductor G1D. As indicated by dotted lines in the pulse chart of Figs. 26 and 27, the application of a positive-going pulse to each of the output conductors G1S1–G1S10 is delayed by .25 microsecond following the stepping of the ring counter so as to allow sufficient time to clamp the voice path, as will be discussed more fully hereinafter. Thus, .75 microsecond pulses appear on each of the conductors G1S1–G1S10 in turn with a guard time of .25 microsecond between pulses on successive conductors. Pulses on any one of said conductors occur at a 100 kc. rate and are used to operate a subgroup gate and a subgroup distributor. For example, the leading edge of each pulse occurring on conductor G1S1 is used to trigger the group 1 subgroup 1 receive and send gates 27A and 27B and the trailing edge of each pulse occurring on conductor G1S1 is used to advance the setting of the group 1 subgroup 1 distributor 31, which may comprise a ten-stage ring counter of any well known type.

As indicated by dotted lines in the pulse chart of Figs. 26 and 27, the application of a positive-going pulse to each of the conductors G1S1L1–G1S1L10 is delayed by .25 microsecond following the stepping of the ring counter in distributor 31 so that 9.75 microsecond pulses appear on each of the conductors G1S1L1–G1S1L10 in turn with a guard time of .25 microsecond between pulses on successive conductors. The pulses on any one of said conductors occur at a 10 kc. rate and the leading edge of each pulse is used to trigger the line gate in an individual one of the line terminating units. For example, the pulses occurring on conductor G1S1L1 are used to trigger the line gate included in line terminating unit 21. Thus, it can be seen that the master gate is operated during each time position channel, the group, the group gates are operated in succession during succeeding operations of the master gate, the subgroup gates for each group of lines are operated at a submultiple of the frequency of operation of the group gate for that group of lines, and the line gates for each subgroup of lines are operated at a submultiple of the frequency of operation of the subgroup gate for that subgroup of lines, and each line is sampled once per time position pulse frame.

Referring to Fig. 27, it can be seen that during time position channel 1 the master gate is, of course, operated by the negative two megacycle pulse, the group 1 gate is operated by the negative pulse on conductor G1G, the group 1 subgroup 1 gate is operated since a positive-going pulse occurred on conductor G1S1 .25 microsecond previously, and the line gate in line terminating unit 21 is operated since a positive-going pulse appeared on conductor G1S1L1 9.25 microseconds previously. Also as shown in Fig. 27, the first line in the first subgroup of the second group is sampled during the position channel 2, the first line in the second subgroup of the first group is sampled during time position 3, etc. To facilitate the understanding of the invention, the complete assignment of time position channels in a two hundred line system is tabulated below.

| Lines | Time Position Channels |
|---|---|
| Group 1: | |
| Subgroup 1 | 1, 21, 41, 61, 81, 101, 121, 141, 161, 181. |
| Subgroup 2 | 3, 23, 43, 63, 83, 103, 123, 143, 163, 183. |
| Subgroup 3 | 5, 25, 45, 65, 85, 105, 125, 145, 165, 185. |
| Subgroup 4 | 7, 27, 47, 67, 87, 107, 127, 147, 167, 187. |
| Subgroup 5 | 9, 29, 49, 69, 89, 109, 129, 149, 169, 189. |
| Subgroup 6 | 11, 31, 51, 71, 91, 111, 131, 151, 171, 191. |
| Subgroup 7 | 13, 33, 53, 73, 93, 113, 133, 153, 173, 193. |
| Subgroup 8 | 15, 35, 55, 75, 95, 115, 135, 155, 175, 195. |
| Subgroup 9 | 17, 37, 57, 77, 97, 117, 137, 157, 177, 197. |
| Subgroup 10 | 19, 39, 59, 79, 99, 119, 139, 159, 179, 199. |
| Group 2: | |
| Subgroup 1 | 2, 22, 42, 62, 82, 102, 122, 142, 162, 182. |
| Subgroup 2 | 4, 24, 44, 64, 84, 104, 124, 144, 164, 184. |
| Subgroup 3 | 6, 26, 46, 66, 86, 106, 126, 146, 166, 186. |
| Subgroup 4 | 8, 28, 48, 68, 88, 108, 128, 148, 168, 188. |
| Subgroup 5 | 10, 30, 50, 70, 90, 110, 130, 150, 170, 190. |
| Subgroup 6 | 12, 32, 52, 72, 92, 112, 132, 152, 172, 192. |
| Subgroup 7 | 14, 34, 54, 74, 94, 114, 134, 154, 174, 194. |
| Subgroup 8 | 16, 36, 56, 76, 96, 116, 136, 156, 176, 196. |
| Subgroup 9 | 18, 38, 58, 78, 98, 118, 138, 158, 178, 198. |
| Subgroup 10 | 20, 40, 60, 80, 100, 120, 140, 160, 180, 200. |

From the above chart it can be seen that the time position channels of the transmission network are assigned successively to the group of lines, the channels assigned to each group of lines are assigned successively to the subgroups of lines in that group of lines, and the channels assigned to each subgroup of lines are assigned successively to the lines in that subgroup.

Clamp circuits are provided throughout the system for the purpose of momentarily applying ground potential to the various sections of the voice path after each operation of the various gates for the purpose of discharging stray capacitance and thus preventing cross-talk between channels. Each clamp circuit is designed to have an operated time of less than .25 microsecond so that ground potential is applied to its associated section of the voice path only while the gates connected to that section are in their non-operated or open condition. Clamp circuit 32 is triggered by the trailing edge of each negative pulse which triggers the master gate receive and send gates 25A and 25B and serves to apply ground potential to the transmission network conductors receive and send while operated. Clamp circuit 33 is also triggered by the trailing edge of each negative pulse received from the square wave generator 28 and thus applies ground potential to the section of the voice path between the group gates and the master gate during the intervals of time while both the group gates and the master gate are not operated or closed. Clamp circuit 34 is triggered by the trailing edge of each negative pulse appearing on conductor G1G to apply ground potential to the section of the voice path between the subgroup gates in group 1 and the group 1 gate. It will be recalled that the pulses applied to conductors G1S1–G1S10 by distributor 30 are delayed .25 microsecond following the stepping of the ring circuit in distributor 30. Therefore, all of the subgroup gates and the group gate are open at the time that ground potential is applied by clamp circuit 34. Similarly, clamp circuit 35 is triggered by the trailing edge of each pulse appearing on conductor G1S1, which pulses also trigger gates 27A and 27B and step distributor 31, to apply ground potential to the section of the voice path between the line gates in the first subgroup of group 1 and gates 27A and 27B. Since the pulses applied to conductors G1S1L1–G1S1L10 by distributor 31 are delayed .25 microsecond following the stepping of the ring circuit in distributor 31, all of the above-mentioned line gates in gates 27A and 27B are open at the time that ground potential is applied by clamp circuit 35.

To illustrate the operation of the system, first assume that direct dialing register allotter 36 has assigned an idle direct dialing register, such as 37, for use and that link allotter 38 has assigned an idle link circuit, such as 39, for use. Next assume that a voice frequency seize signal appears on the trunk line receive conductors terminated by line terminating unit 21 and that samples of said seize signal therefore appear on the group send conductor in time position 1, the time position permanently assigned to the line terminated by unit 21. Seize detector 40 is provided in the system for the purpose of continuously scanning each idle one of the time position channels for seize signals. Seize detector 40 comprises a slip counter which functions to control the connection of a multifrequency signal detector in circuit 40 to a particular time position channel for forty consecutive frames and to then control the connection of the multifrequency signal detector to the next succeeding idle time position channel. The multifrequency signal detector is connected to a particular time position channel only if that channel is not marked busy within the illustrated center by a pulse in that time position on the busy test conductor BT. Thus, the multifrequency signal detector in seize detector 40 is connected to each idle time position channel in turn for a period of forty times the frame rate or four milliseconds.

If a seize signal is detected by seize detector 40, the scanning operation is arrested and a connect demand signal is applied to direct dialing register connect demand conductor DRCD. Allotter 36 is responsive to the receipt of a connect demand signal to apply a demand answer signal to conductor DRDA, which extends to seize detector 40, and to apply a read-control signal to conductor DRC1, which extends to the allotted register 37. The seize detector 40 is responsive to the receipt of a demand answer signal on conductor DRDA to apply a pulse in the time position of the calling line to calling slot pulse in conductor CSP–I, which extends to the slot pulse regeneration circuit 41. The pulse is inverted and regenerated in circuit 41 and routed over the calling slot pulse out conductor CSP–O to the direct dialing registers and the link circuits. Only direct dialing register 37 is enabled to read in the channel identification information applied to conductor CSP–O at this time since a read-control signal is applied to conductor DRC1 by allotter 36, as stated above.

When the channel pulse identity has been read into direct dialing register 37, a busy signal is applied to busy free conductor DBF1 for the purpose of controlling allotter 36 to remove the demand answer signal from conductor DRDA and the read in control signal from conductor DRC1. When the signal is removed from conductor DRDA, seize detector 40 removes the connect demand signal from conductor DRCD and then resume its scanning operation. Allotter 36 then advances to preallot the next idle register for use on the next call.

The calling channel identity read into direct dialing register 37 is now utilized to control the connection of a calling multifrequency signal detector in register 37 to time position channel 1 on the group send conductor over calling send conductor CS and to apply a pulse in the time position of the calling line to conductor BT to thereby mark time position channel 1 as busy to seize detector 40 and route selector 42. Register 37 functions to return a burst of seize tone followed by dial tone over calling receive conductor CR to conductor group receive in time position channel 1. The signals applied to conductor group receive in time position channel 1 are demodulated in line terminating unit 21 and the resulting demodulated signals are transmitted over the trunk send conductors terminated by unit 21 to the originating local office. In the originating local office, the received seize signal is utilized to terminate the transmission of a seize signal by that office and the connection is extended through that office so that dial tone may be heard by the originating party.

Compound voice frequency signals representing digits of the called subscriber station number are now received over the calling trunk line, detected by the calling multifrequency signal detector in register 37, and the digits corresponding to the received signals are registered in register 37.

There are three possible call situations which may occur. That is, the call may be extended through the illustrated long distance switching center to another long distance switching center, it may be extended through the illustrated center to a local office, or the call may be extended to a service line in the illustrated center. First assume that the call is to be routed through the illustrated long distance switching center to another long distance switching center, as signified by the receipt of a compound voice frequency signal which corresponds to one of the digits "2–9." At the termination of the first digit, under these conditions, register 36 functions to apply a connect demand signal to conductor FCD1, which extends to register finder 43. When register finder 43 has found register 37, a demand answer signal is applied to conductor FDA1 and register 37 is thereby controlled to apply digit marking information representing the first digit stored in said register to the digit marking cable DM1 and to apply marking potential to conductor DD to identify the calling register as a direct dialing register to the route selector. Cable DM1 comprises five conductors and ground potential is applied to a unique combination of two-out-of-five of said conductors for each digit. Route selector 42 is responsive to the receipt of marking on the conductors of cable DM1 to search for an idle line terminating unit in the group of units corresponding to the digit represented by said marking. Also, after a slight delay following the receipt of digit marking, the route selector 42 functions to apply an allotter inhibit signal to conductor AI, which extends to the direct dialing register allotter 36 and to the register finder 43, for a purpose which will be explained later. The route selector finds the first idle terminating unit in the designated group of units by comparing the time positions of the terminating units of the group in turn with the busy pulses appearing on conductor BT.

Assuming that an idle unit is found in the designated group of units, route selector 42 functions to apply a read in signal to conductor RTD and to apply a pulse in the time position of the selected line to the terminating slot pulse in conductor TSP–I. The time position pulse is inverted and regenerated in circuit 41 and applied over conductor TSP–O to the direct dialing registers and the link circuits. Since register 37 is enabled at this time by register finder 43 over conductor FDA1, only register 37 is enabled by potential on conductor RTD to read in the terminating time position identification signal. When the terminating time position identification has been read into register 36, the connect demand signal is removed from conductor FCD1, register finder 43 is released, and digit marking information is removed from conductor DM1 to release the route selector.

Register 37 thereafter functions to apply a pulse in the time position of the selected or called unit to busy test conductor BT. The direct dialing register now functions to transmit seize and digit signals alternately over conductor TR in the time position of the called unit to and through the selected unit to the next succeeding office. Acknowledgement signals received over the extended connection and which appear on conductor group send in the time position of the called unit are routed over conductor TS to a called multifrequency signal detector in register 37. Thus, it can be seen that direct dialing register 37 is controlled by the calling subscriber station and controls the further extension of the connection to the called subscriber station. The connection is split in register 37. That is, no talking path exists between the calling and called ends of the connection.

The sequence of signaling continues as described in conjunction with the description of Fig. 1, until an end of call signal, which indicates that the call has been extended to the called subscriber station or that a busy condition has been encountered in the extended connection, is detected by the called multifrequency signal detector in register 37. When an end of call signal is received, register 37 functions to transmit a connect demand signal to register finder 43 over conductor FCD1. When register 37 is found by register finder 43, a demand answer signal is applied to conductor FDA1, as previously described. Register 37 is responsive to the receipt of a demand answer signal under these conditions to apply a write-direct signal to conductor WD, which extends to route selector 42. When a write-direct signal is received by the route selector, the route selector does not search for an idle terminating unit but, rather, applies an allotter inhibit signal to conductor AI to prevent the establishment of new connections while the identification crossbars are being used to route information from the direct dialing register to the allotted link circuit, and, after a slight delay, applies a write-read signal to conductor WRO. The signal applied to conductor WRO is effective to control register 37 to apply time position identifying information to conductors CSP–I and TSP–I.

The calling and terminating time position identifying information applied to the busbars by register 37 is read into the link circuit allotted for use at this time by link allotter 38. That is, if marking potential is applied to conductors XML1 and YML1 by link allotter 38, link circuit 39 is enabled by the signal on conductor WRO to read in any information appearing on the conductors CSP–O and TSP–O. When the calling and terminating identification has been read into the storage circuits in link circuit 39, a link busy signal is applied to conductor LF, which extends to link allotter 38. Link allotter 38 then functions to apply a signal to conductor LM, which controls register finder 43, to discontinue the transmission of a demand answer signal over conductor FDA1 to register 37. When the demand answer signal is removed from conductor FDA1, register 37 removes the signal from conductor WD to release the route selector, discontinues the transmission of time position identification information, and then releases from the connection.

When the calling and terminating identification information is read into link circuit 39, the link circuit thereafter functions to mark the calling and called units busy on conductor BT and also functions to identify the calling and called units to link connector 48, which is individually associated with link circuit 39. The time position of the calling line is identified to link connector 48 over conductor CSP–L and the time position of the called line is identified to link connector 48 over conductor TSP–L. Link connector 48 serves to complete a connection between the time position channels identified over conductors CSP–L and TSP–L. Thus, a connection is completed in the illustrated long distance switching center between the calling subscriber station in the originating local office and the called subscriber station or a busy tone circuit in a succeeding office.

Link circuit 39 remains engaged until a voice frequency release signal is received from either the calling subscriber station or the called subscriber station and detected by release detector circuit 44. Signals appearing on conductor group send are coupled through the high input impedance read-off circuit 45 to release detector 44 and circuit 44 is controlled to scan all of the time position channels marked busy on busy test conductor BT for release signals. When a release signal is detected by circuit 44, a pulse in the time position of the channel on which the signal is detected is applied to release marking conductor RM. If the pulses received over conductor RM correspond to the time position channel assigned to either the calling or called unit served by link circuit 39, link circuit 39 functions to apply pulses in the time positions of its calling and called units to conductor TSR for a period of two seconds for the purpose of controlling release tone generator 46 to apply release tone to those time position channels on conductor receive. After the time period, link circuit 39 is released. Thus, it can be seen that a release signal will be detected and retransmitted in each office or long distance switching center involved in the extended connection.

Returning to the consideration of route selector 42, it will be recalled that the route selector is controlled to search for an idle terminating unit in accordance with digit marking corresponding to the first digit stored in register 37 and that it was assumed that the route selector was successful in finding an idle unit. When all of the units in the desired group are busy, the route selector functions to apply a signal to conductor WRO rather than to conductor RTD. The effect of this operation is that the calling line time position channel identity is read out of register 37 and into link circuit 39. Simultaneously therewith, potential is applied to busy marking conductor BY by route selector 42. Link circuit 39 is responsive to the receipt of potential on conductor BY to apply pulses in the time position of the calling unit to conductor TSB, which extends to busy tone generator 47, and generator 47 therefore applies busy tone to conductor receive in the time position of the calling unit.

The operation is slightly different from the above when the call is to be routed to a local office as signified by the receipt of the compound voice frequency signal corresponding to the digit "1" as a first digit by direct dialing register 37. Under these conditions, register 37 does not transmit a connect demand signal to register finder 43 at the completion of the first digit but, rather, delays until the second digit, which actually identifies the desired local office, has been registered before demanding connection. When a demand answer signal is received, the digit "1" is marked on the conductors of cable DM1 and the second digit is marked on the conductors of cable DM2, which also extends to route selector 42. Subsequent operation is identical to that described above for routing a call to another long distance switching center.

Next assume that the first two digits registered in direct dialing register 37 are the digits corresponding to one of the service lines provided in the illustrated system. With the illustrated numbering scheme, up to nine service lines can be provided and are assigned the digits "01–09," respectively. Whenever the compound voice frequency signal corresponding to the digit "0" is received as the first digit, the register does not transmit digit information to the route selector until a second digit has been received. Upon completion of the second digit and when the register has been found by the register finder, register 37 reads out the digit information over cables DM1 and DM2 to the route selector and the route selector tests the idle or busy condition of the desired line. Since the service line is located within the illustrated long distance switching center and it is therefore not desirable to read the identification of the called unit back into the register, a signal is not applied to conductor DD when a service line is being called. Therefore, at the completion of its busy test, route selector 42 applies a write-read signal to conductor WRO and the calling and called unit identification information is read out of the register 37 and route selector 42, respectively, and into the allotted link circuit. Under these conditions, a service line signal is also applied to conductor SL by the route selector for the purpose of controlling the link circuit to control the ringing tone generator 49 to couple ring tone to the calling and called lines. When a signal is received on conductor SL by link circuit 39 while that link circuit is allotted for use, link circuit 39 functions to apply pulses in the time positions of the calling and called units, the identities of which have been read in by that link, to conductor TSRG, which extends to ringing tone generator 49 and to ring trip detector circuit 50. Ringing tone generator 49 is responsive to the receipt of time position defining pulses over conductor TSRG to apply ringing tone to the transmission network conductor receive in those time position channels. Ringing tone applied in the time position channel of the calling unit serves as a ringback tone signal to the calling line and the ringing tone applied in the time position channel of the called unit serves as a ringing signal to the called line. When the called station goes off-hook, a seize signal is generated by said station and is utilized as a ring trip signal in the illustrated long distance switching center. The seize signal is coupled through read-off circuit 45 and is detected by ring trip detector circuit 50, which is controlled to scan the time position channels identified on conductor TSRG, in turn, for seize signals. When a seize signal is detected by the ring trip detector circuit 50 in a particular time position channel, a pulse in that time position is transmitted over conductor RTM to the link circuits and is effective in the link circuit serving the called unit identified by that time position to control that link circuit to terminate the transmission of pulses over conductor TSRG and thus terminate the transmission of ringing tone to the calling and called lines. Release of the link circuit on a call to a service line is controlled by release detector circuit 44 in the exact same manner as previously described for a call to another long distance switching center.

Only the circuits not shown and described in complete detail in the above-identified copending application Serial Number 814,926 are shown and described in detail in this application. The circuits shown in detail in this application have been illustrated in logic schematic form. That is, each circuit component, such as an amplifier, a gate, etc., is represented by a particular logic symbol. The logic symbols, together with a typical circuit component represented by each symbol, are shown in Figs. 3A–18B, inclusive, of the drawings. Although most of the illustrated circuit components are entirely conventional in design and are well known in the art, it is believed expedient to a more complete understanding of the invention to briefly describe, where necessary, the operation of the various circuit components before proceeding to describe in detail the operation of the various circuits.

*Audio amplifier AUA.*—The logic symbol for amplifier AUA is shown in Fig. 3A and a typical circuit represented by said symbol is shown in Fig. 3B. The illustrated circuit is a balanced amplifier in which the transistors are biased for class A operation. The signal to be amplified is applied across input terminals A and C and the amplified signal appears across output terminals D and E. A center tap terminal F is also provided on the output transformer.

*Blocking oscillator gate BOG.*—The logic symbol for blocking oscillator gate BOG is shown in Fig. 4A and a typical circuit represented by said symbol is shown in Fig. 4B. The illustrated circuit comprises a diode bridge in which the individual diodes of the bridge are normally biased in the reverse direction so as to present a very high impedance and thus prevent a transfer of energy between terminals B and A. The bridge diodes are biased in the forward direction to present a very low impedance and thus permit the transfer of energy between terminals A and B only when the blocking oscillator transistor is conductive. As used in the link connectors, the group gates, the seize detector, and the direct dialing registers of the illustrated telephone system, the blocking oscillator transistor is triggered into conduction by the leading edge of a time position defining pulse applied across terminals C and D and the time constant of the blocking oscillator is such that the transistor is conductive and the bridge diodes are biased in the forward direction for a period of .25 microsecond regardless of the duration of the input pulse. As used in the master gate, the time constant of the blocking oscillator is slightly less than .25 microseconds so that the master gate controls the resonant transfer time of the system, as previously explained. As used in the subgroup gates, the blocking oscillator transistor is triggered into conduction by the leading edge of each .75 microsecond pulse received over its individual conductor from the subgroup distributor and has a time constant slightly less than .75 microsecond. As used in the line gates, the blocking oscillator transistor is triggered into conduction by the leading edge of each 9.75 microsecond pulse received over its individual conductor from the line distributor and has a time constant of slightly less than 9.75 microseconds. As used in the clamp circuits, the blocking oscillator transistor is triggered into conduction by the trailing edge of each input pulse and the time constant of the blocking oscillator is such that the transistor is conductive and the bridge diodes are biased in the forward direction to apply ground potential to the voice path for a period of approximately .15 microsecond.

*Emitter follower EFB.*—The logic symbol for emitter follower EFB is shown in Fig. 5A and a typical circuit represented by said symbol is shown in Fig. 5B. Emitter follower EFB is of the type which has a very high input impedance and is used in read-off circuit 45.

*Emitter follower EFE.*—The logic symbol for emitter follower EFE is shown in Fig. 6A and a typical circuit represented by said symbol is shown in Fig. 6B.

*Emitter follower EFJ.*—The logic symbol for emitter follower EFJ is shown in Fig. 7A and a typical circuit represented by said symbol is shown in Fig. 7B. Emitter follower EFJ is a high speed emitter follower as denoted by the vertical lines within the triangle of the logic symbol. Inductance element 701 is included in the emitter circuit of transistor 702 for the purpose of quickly bringing the transistors 702 and 703 out of saturation at the termination of a pulse applied to input terminal B.

*Flip-flip FIA.*—The logic symbol for flip-flip FIA is shown in Fig. 8A and a typical circuit represented by said symbol is shown in Fig. 8B. In the reset condition of the circuit, both transistors 801 and 802 are non-conductive, ground potential appears on conductor D, and negative potential appears on output conductor E. It should be noted that these conditions are denoted in the logic symbol by the connection of terminal D to the half of the flip-flip circuit marked zero and the connection of terminal E to the half of the flip-flip marked one. The flip-flip circuit is triggered to the condition in which both transistors 801 and 802 are conductive by the application of a negative pulse to either of the terminals B or D or by the application of a positive pulse to either of the terminals C or E. The circuit is restored to its reset condition by the application of a positive pulse to either of the terminals A or G. Silicon diode 803 is included in the circuit for the purpose of assuring the reverse biasing of the base emitter junction of transistor 802 when the circuit is in its reset condition. Since the voltage drop across a silicon diode is approximately .6 volt for all values of forward current exceeding a certain minimum value, the emitter of transistor 802 is biased .6 volt positive with respect to its base whenever transistor 801 is non-conductive.

*Flip-flop FOB.*—The logic symbol for flip-flop FOB is shown in Fig. 9A and a typical circuit represented by said symbol is shown in Fig. 9B. Flip-flop FOB is a high speed circuit which is normally used as a binary counting stage. Terminals A and B are strapped together and a positive-going pulse is applied to the strapped terminals to trigger the circuit. It can be seen that when transistor 901 is conductive, the cathode terminal of steering diode 903 is positive with respect to the anode of said diode while the cathode terminal of steering diode 904 is negative with respect to the anode terminal of that diode. Therefore, a positive-going pulse applied to terminals A and B is coupled through diode 904 to trigger transistor 901 non-conductive and transistor 902 conductive. Conversely, when transistor 902 is conductive, the positive pulse applied to terminals A and B is coupled through diode 903 to trigger the circuit. At the termination of the operation of a particular circuit when it is desired to return all of the stages of a binary counting chain to their reset condition, a positive-going pulse is applied to terminal H of each counting stage. A positive pulse applied to terminal H serves to render transistor 902 non-conductive if that transistor is conductive.

*Gate GGA.*—The logic symbols for gate GGA are shown in Figs. 10A and 10B and a typical circuit represented by said symbols is shown in Fig. 10C. Gate GGA may be used as either an AND gate for negative signals or an OR gate for positive signals. That is, output terminal A will be at negative potential only when all of the input terminals B, C and D are returned to a negative potential and will rise to ground potential when any one or more of the terminals B, C and D is returned to ground potential. It can be seen in Fig. 10A that an AND gate is indicated by lines from terminals B, C and D which do not extend through the symbol, while an OR gate, as shown in Fig. 10B, is indicated by lines from terminals, B, C and D which extend through the symbol. The resistor input in both cases, and in all of the other gates disclosed, is denoted by a closed arrow.

*Gate GJD.*—The logic symbols for GJD are shown in Figs. 11A and 11B and a typical circuit represented by said symbols is shown in Fig. 11C. Gate GJD may be used as either an AND gate for positive signals or an OR gate for negative signals. That is, output terminal A will be at ground potential only when all of the input terminals B, C and D are returned to ground potential and will drop to a negative potential when any one or more of terminals B, C and D is returned to a negative potential.

*Inverter amplifier INA.*—The logic symbol for amplifier INA is shown in Fig. 12A and a typical circuit represented by said amplifier is shown in Fig. 12B. It is to be noted that an inverter is indicated by a vertical line extending through the conventional triangular symbol for an amplifier, as shown in Fig. 12A. As illustrated in Fig. 12B, the inverter may be used as an AND gate or as a gated amplifier since a negative signal must be applied to the base input terminal B and a positive or ground potential signal must be applied to emitter input terminal C for the amplifier to be biased for conduction. If terminal C is permanently returned to ground potential, terminal C is eliminated from the logic symbol.

*Inverter amplifier INC.*—The logic symbol for amplifier INC is shown in Fig. 13A and a typical circuit represented by said symbol is shown in Fig. 13B. Inverter amplifier INC differs from amplifier INA only in that the emitter is permanently returned to ground potential and a diode rather than a resistor is included in series between terminal B and the base electrode of the transistor for the purpose of providing a low base input impedance.

*High speed amplifier ING.*—The logic symbol for amplifier ING is shown in Fig. 14A and a typical circuit represented by said symbol is shown in Fig. 14B. Amplifier ING is high speed by virtue of the fact that the base circuit of the transistor is clamped to the collector circuit of the transistor by a back-clamping diode. This back-clamping arrangement prevents the transistor from going into saturation so that its recovery time is of extremely short duration.

*Inverter amplifier INS.*—The logic symbol for amplifier INS is shown in Fig. 15A and a typical circuit represented by said symbol is shown in Fig. 15B. The transistor is normally biased for non-conduction since its emitter is held approximately 1.2 volts positive with respect to its base because of the voltage drop across the emitter circuit silicon diodes. It is to be noted that the biasing diodes are poled in the forward direction. Each of these diodes has a voltage drop of approximately .6 volt for all values of forward current above a minimum value and the diodes have a very low dynamic impedance when the transistor is rendered conductive.

*Inverter amplifier INU.*—The logic symbol for amplifier INU is shown in Fig. 16A and a typical circuit represented by said symbol is shown in Fig. 16B. The transistor is normally non-conductive and is triggered conductive for approximately 50 microseconds by the leading edge of a positive-going pulse or the trailing edge of a negative-going pulse.

*Monostable multivibrator MAA.*—The logic symbol for multivibrator MAA is shown in Fig. 17A and a typical circuit represented by said symbol is shown in Fig. 17B. In the normal condition of the circuit, transistor 1701 is conductive, transistor 1702 is non-conductive, ground potential is applied to output terminal A, and negative potential is applied to output terminal D. The circuit is triggered into the condition in which transistor 1701 is non-conductive and transistor 1702 is conductive by the application of a positive-going pulse to either of the terminals B or D or by the application of a negative-going pulse to either of the terminals C or A. The circuit reverts to its normal condition only after cross-coupling capacitor 1703 has discharged to the point where the base of transistor 1701 again becomes negative. The duration of the positive-going pulse and the negative-going pulse at terminals D and A, respectively, is indicated in the upper portion of the logic symbol for each monostable circuit.

*Low-pass filter FLN.*—The logic symbol for low-pass filter FLN is shown in Fig. 18A and a typical circuit represented by said symbol is shown in Fig. 18B. As will be described in conjunction with the detailed description of the system circuits, capacitor 1801 and inductor 1802 are used in a series resonant circuit for the resonant transfer of speech and signaling information in the system.

*Detailed description*

In the detailed drawings of the circuits comprising the long distance switching center of Figs. 2A–2D, the D.C. potentials used in the system are shown as the symbols (+), (−), and a ground symbol, and in the detailed description of said circuits which follows, the D.C. potentials are referred to as positive, negative, and ground, respectively. The (+) terminal is a nominal plus twelve volts positive with respect to ground and the (−) terminal is a nominal twelve volts negative with respect to ground.

Figure 19A:
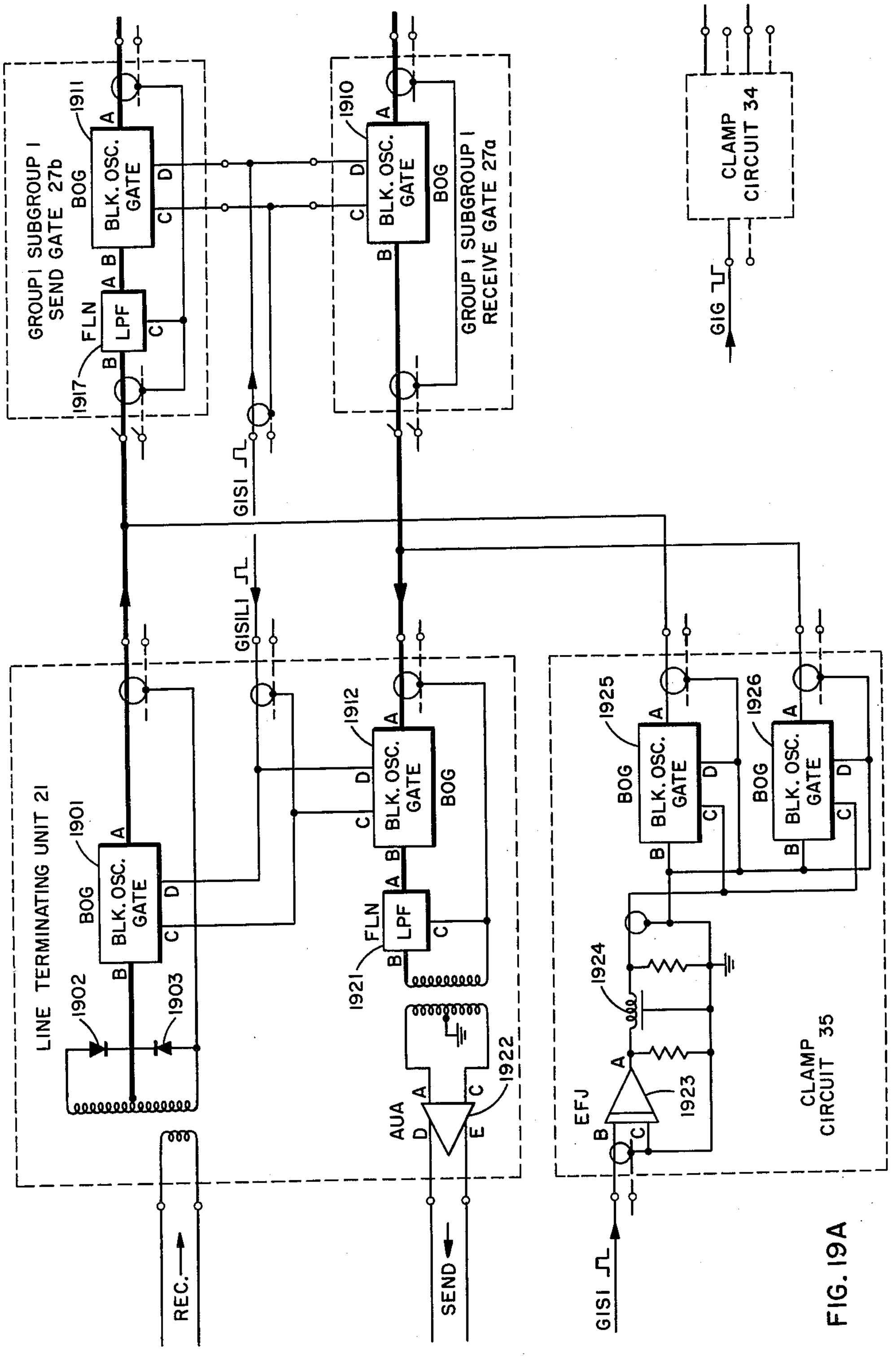
Figure 19B:
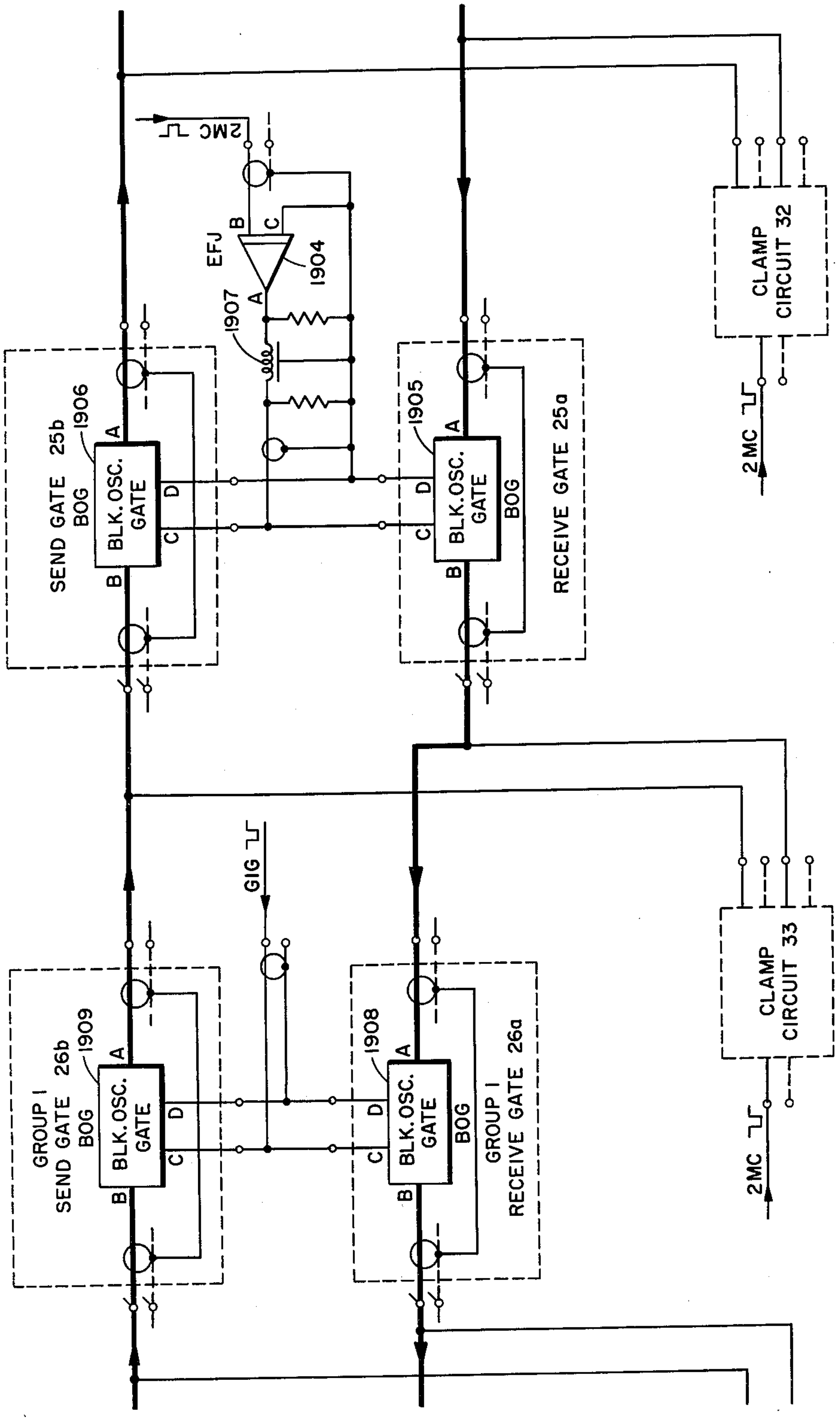
Figure 19C:
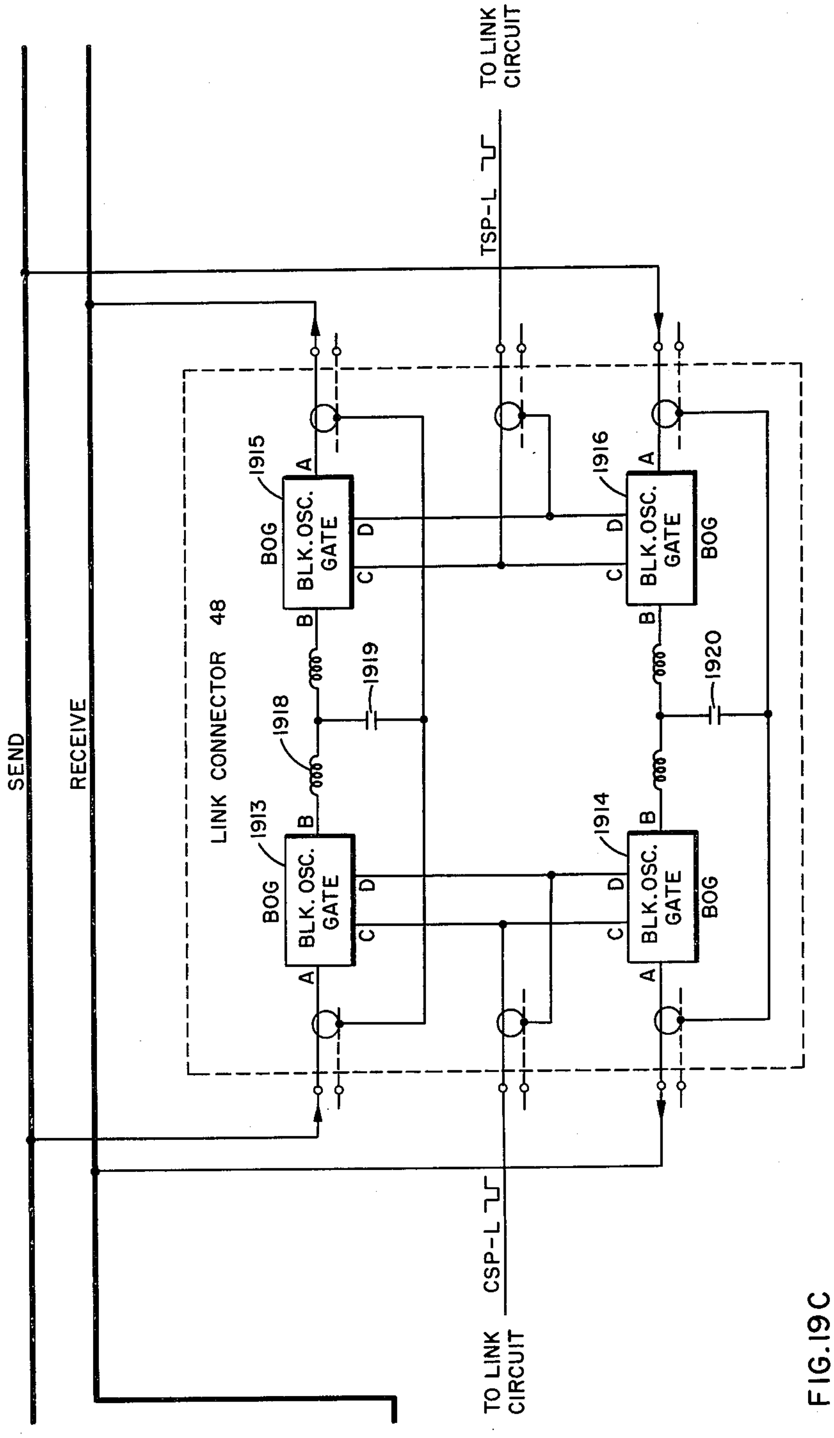

To expedite the understanding of the invention, the various circuits illustrative of the circuits which constitute the voice path, namely, a line terminating unit, a subgroup gate, a group gate, the master gate, a link connector, and the various clamp circuits, have been shown interconnected in Figs. 19A–19C and have been given the same numerical designations as the corresponding blocks in Figs. 2A–2D. It is believed that the operation of these circuits can best be understood by describing the interaction of the voice path circuits rather than describing each of the circuits separately.

A line terminating unit, identical to line terminating unit 21 shown in detail in Fig. 19A, is used to terminate each trunk line from another long distance switching center, each trunk line from a local office, and each service line provided in the illustrated long distance switching center. As illustrated, signals received over the receive conductors from a distant office or a service line are coupled to terminal B of blocking oscillator gate 1901. The maximum voltage swing of the received signals is limited by back-to-back connected Zener diodes 1902 and 1903 so as to prevent false operation of blocking oscillator gate 1901.

As explained in the general description, the master receive and send gates 25A and 25B, which are shown in Fig. 19B, are closed during each time position channel. For this purpose, the two megacycle pulses applied to terminal B of emitter follower 1904 are amplified and coupled to the C terminals of blocking oscillator gates 1905 and 1906 after being delayed by a time interval, which may be .01 microsecond, for example, by the delay line comprising inductor 1907. Further, blocking oscillator gates 1905 and 1906 are designed to have an operated time which is slightly less than the time division channel width so that the time that energy from any given line is transferred to the transmission conductor send and energy is transmitted from the transmission conductor receive to that line is controlled by the master gate. Also as explained in the general description, the group 1 receive and send gates 26A and 26B, which are shown in Fig. 19B, are closed or operated by each negative pulse appearing on conductor G1G, which is connected to the C terminals of blocking oscillator gates 1908 and 1909. Blocking oscillator gates 1908 and 1909 are triggered by the leading edge of each of the one megacycle negative-going pulses on conductor G1G and remain operated for approximately .25 microsecond. The group 1 subgroup 1 receive and send gates 27A and 27B, which are shown in Fig. 19A, are closed or operated by each positive pulse appearing on conductor G1S1, which is connected to the D terminals of blocking oscillator gates 1910 and 1911. Blocking oscillator gates 1910 and 1911 are triggered by the leading edge of each 100 kc. positive-going pulse appearing on conductor G1S1 and remain operated for approximately .75 microsecond. And, finally, the line blocking oscillator gates 1901 and 1912 are closed or operated by each positive-going pulse appearing on conductor G1S1L1, which is connected to the D terminals of the blocking oscillator gates. Blocking oscillator gates 1901 and 1912 are triggered by the leading edge of each 10 kc. positive-going pulse appearing on conductor G1S1L1 and remain operated for approximately 9.75 microseconds.

Figure 1:
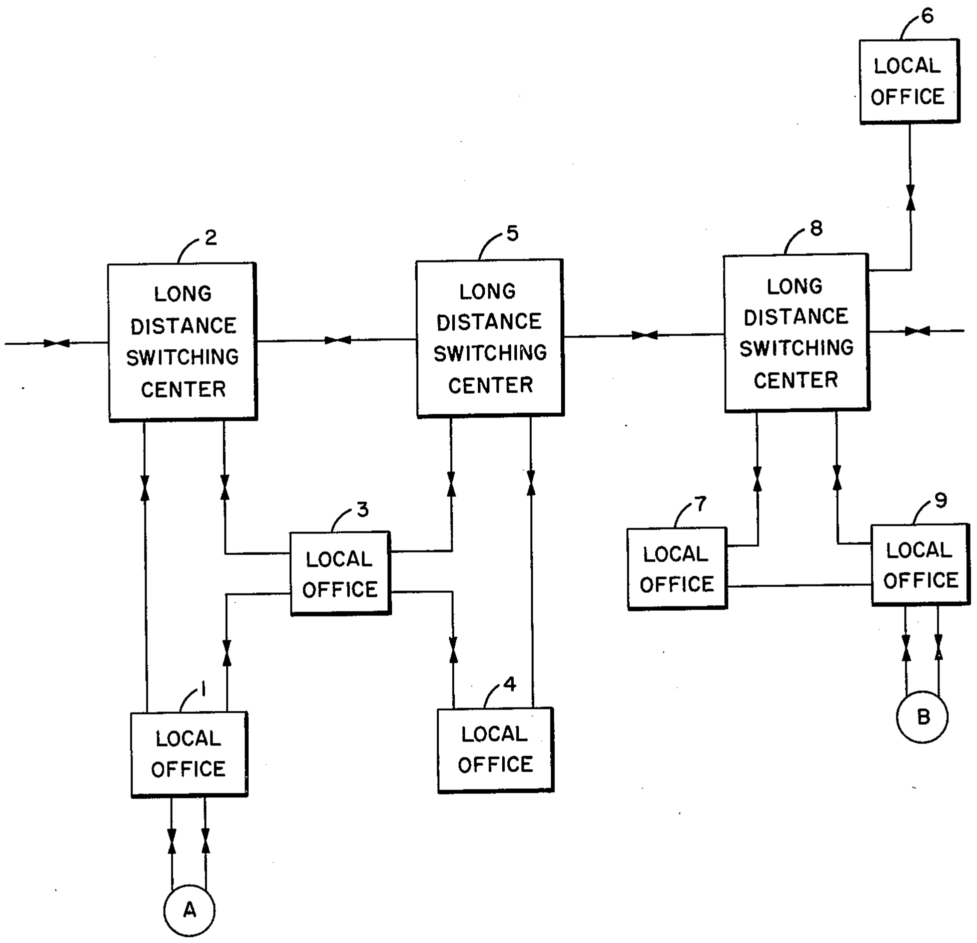
Figure 2A:
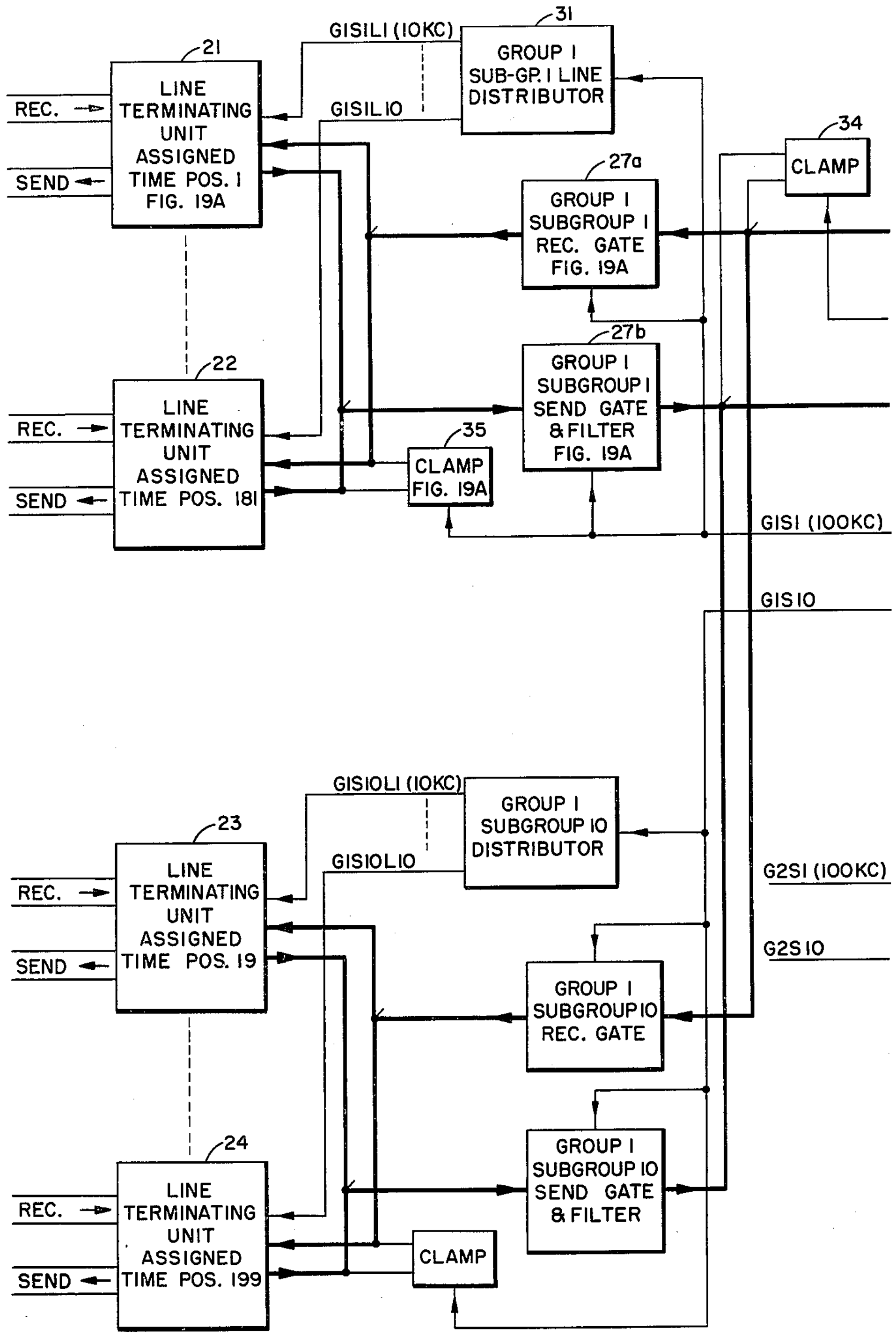
Figure 2B:
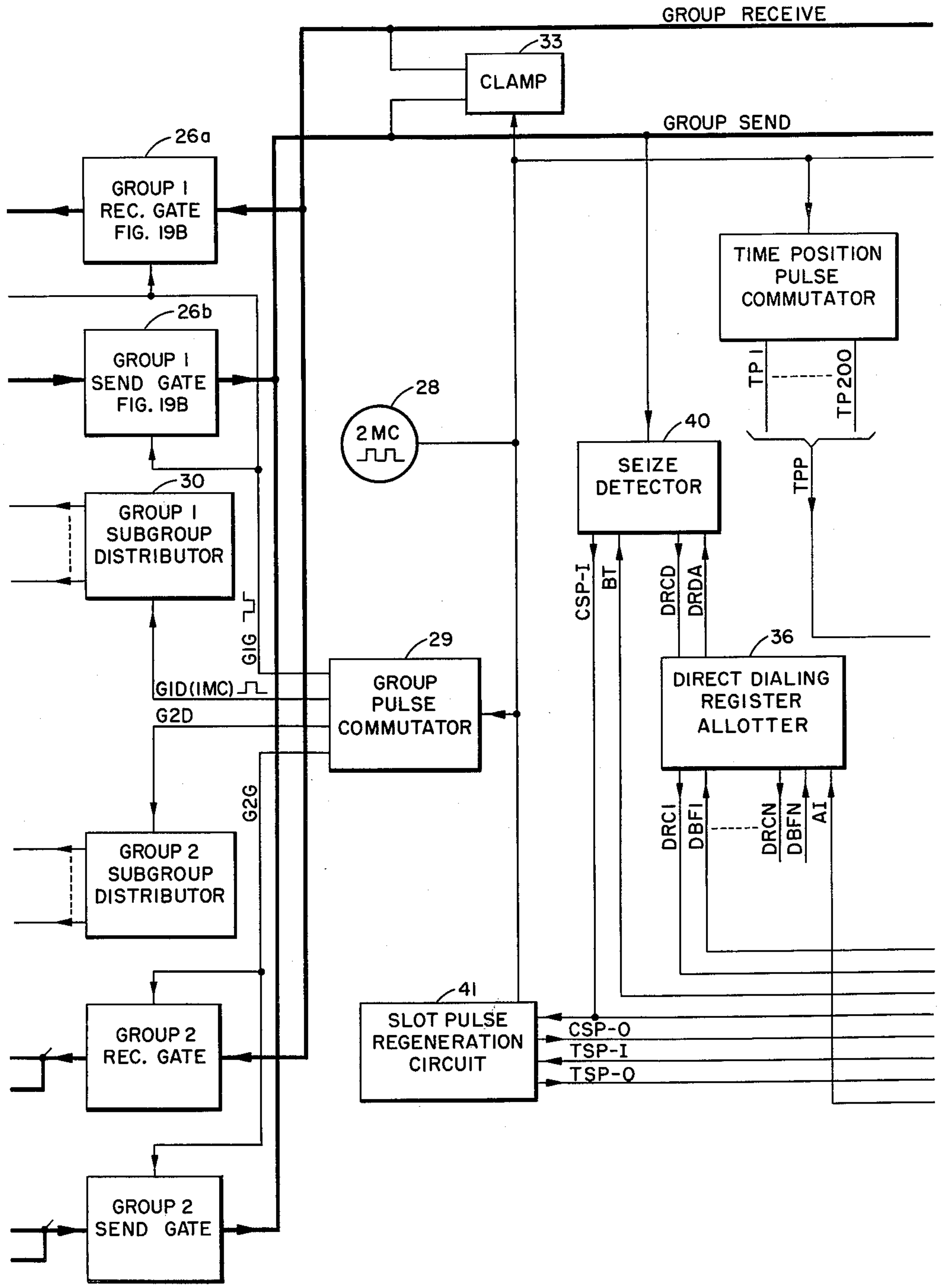
Figure 2C:
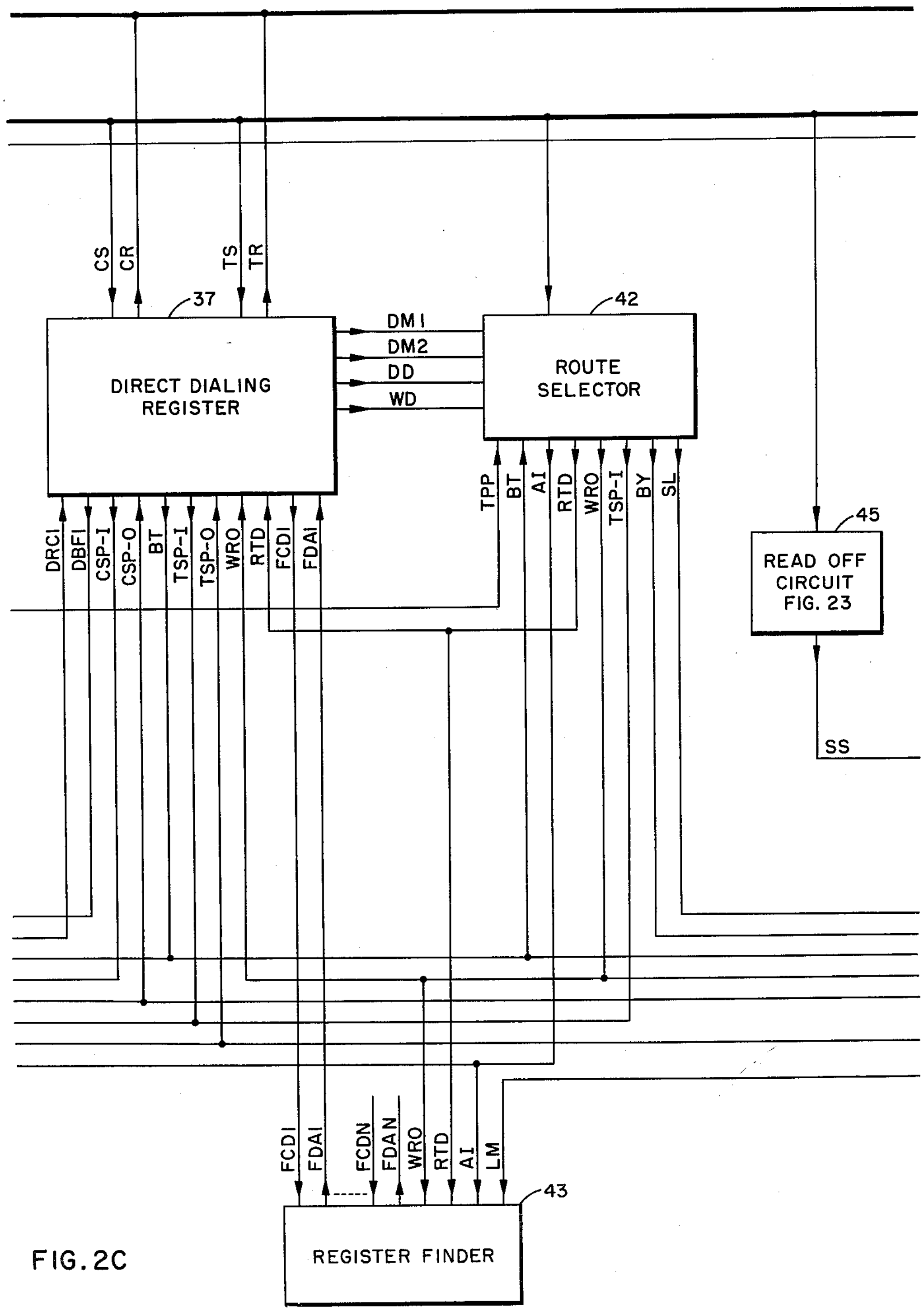
Figure 2D:
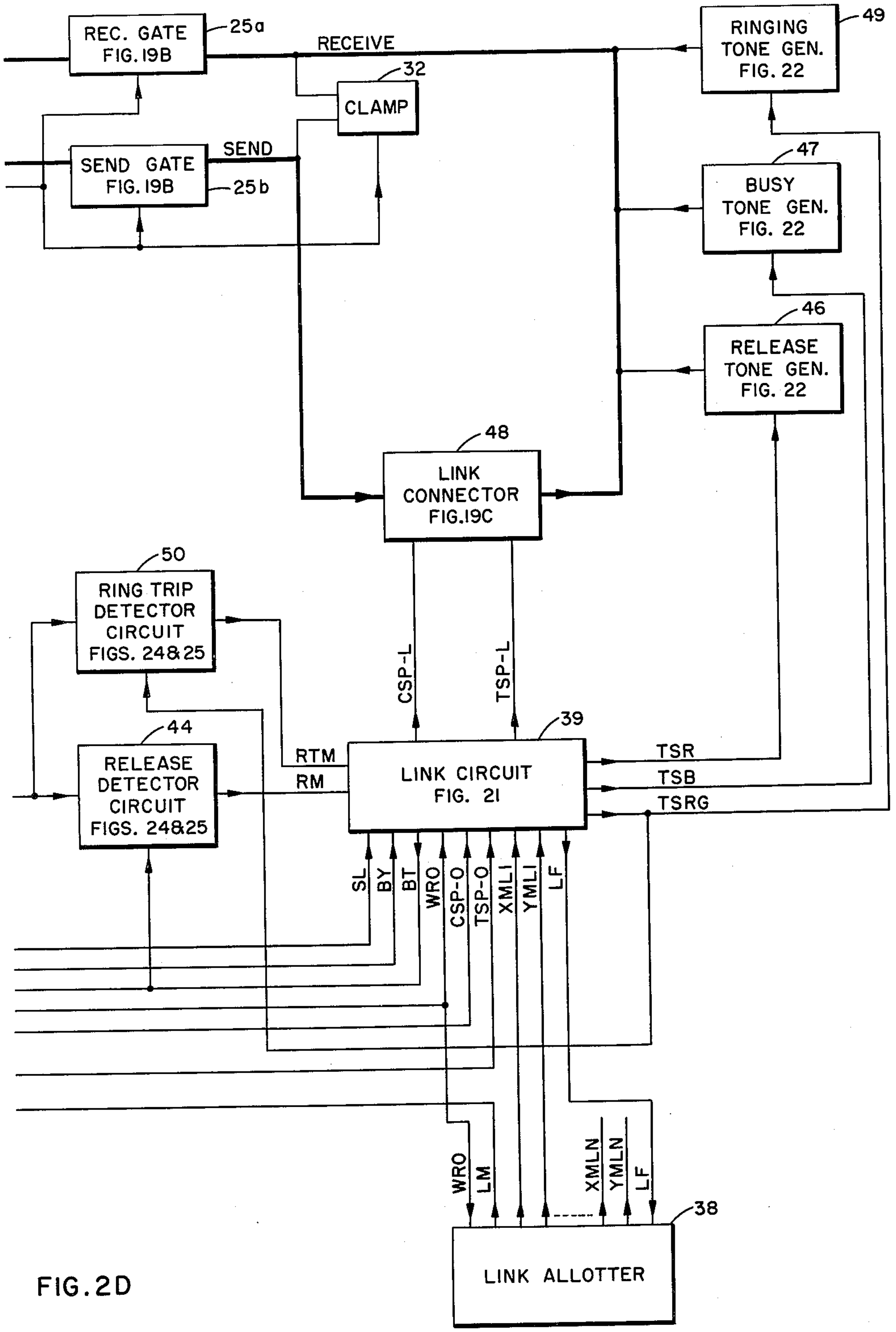
Figure 3A:
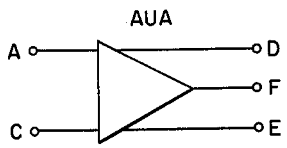
Figure 3B:
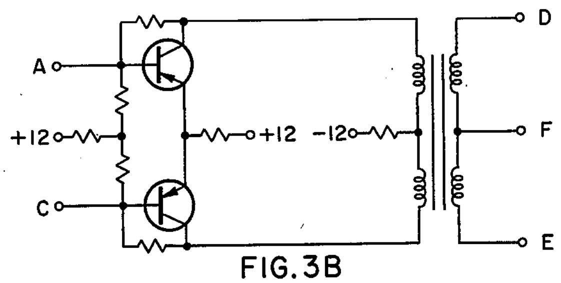
Figure 4A:
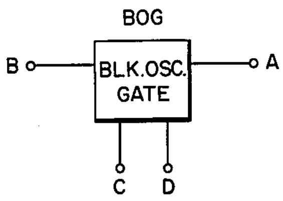
Figure 4B:
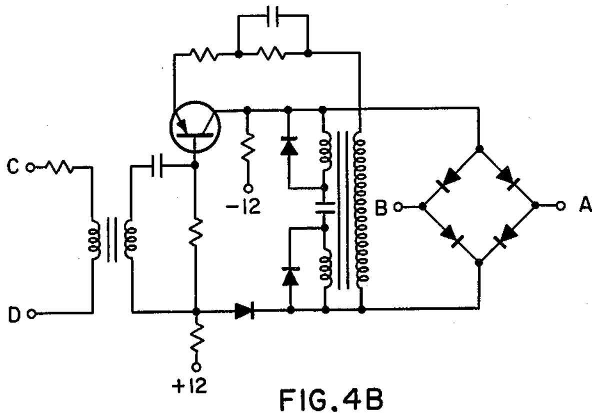
Figure 5A:
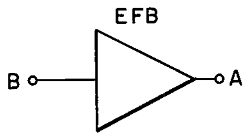
Figure 5B:
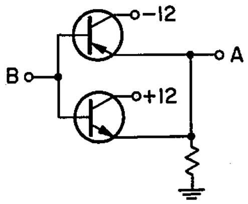
Figure 6A:
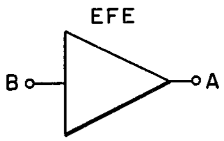
Figure 6B:
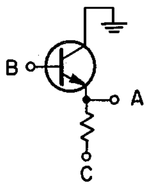
Figure 7A:
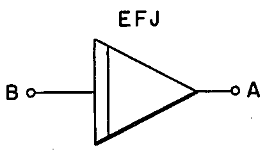
Figure 7B:
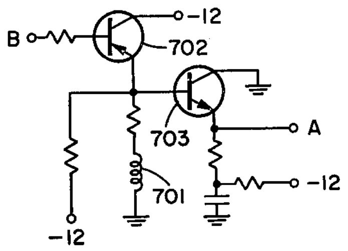
Figure 8A:
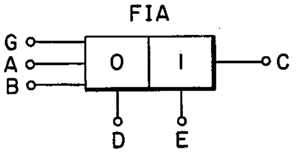
Figure 8B:
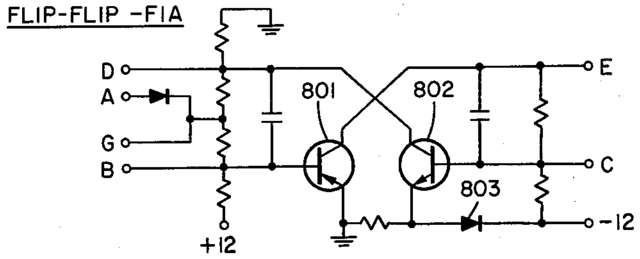
Figure 9A:
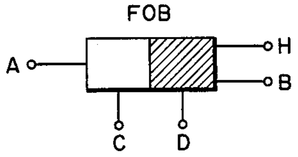
Figure 9B:
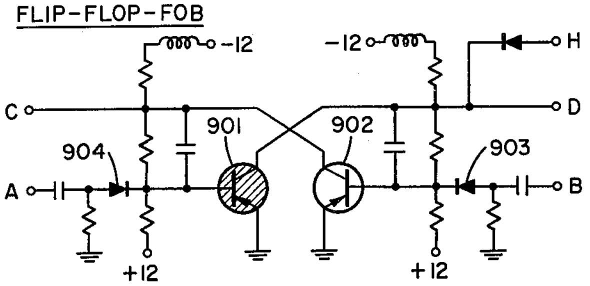
Figure 10A:
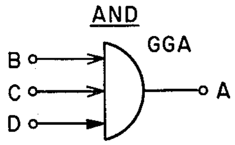
Figure 10B:
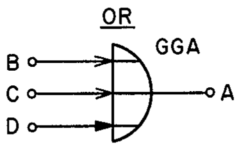
Figure 10C:
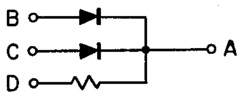
Figure 11A:
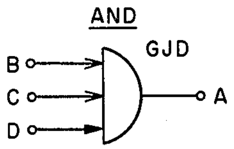
Figure 11B:
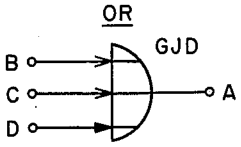
Figure 11C:
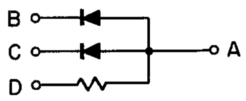
Figure 12A:
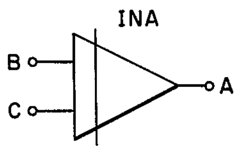
Figure 12B:
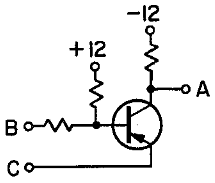
Figure 13A:
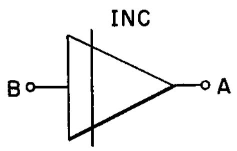
Figure 13B:
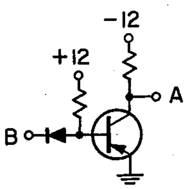
Figure 14A:
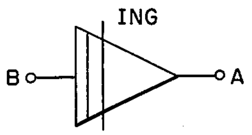
Figure 14B:
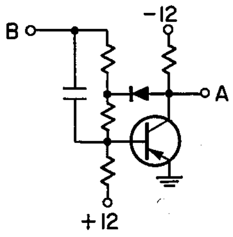
Figure 15A:
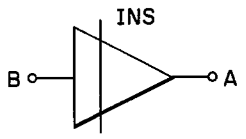
Figure 15B:
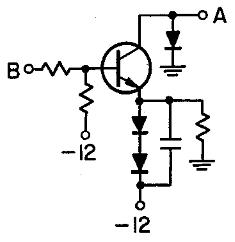
Figure 16A:
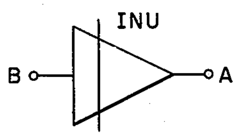
Figure 16B:
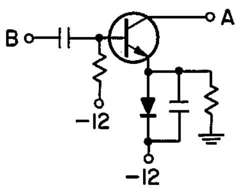
Figure 17A:
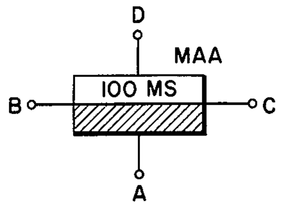
Figure 17B:
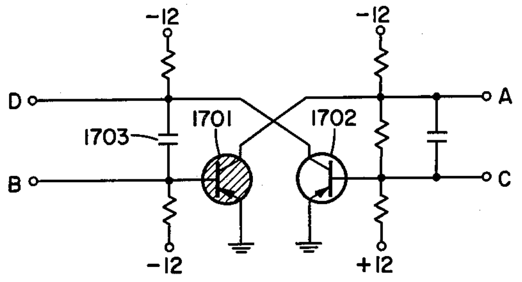
Figure 18A:
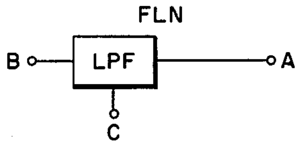
Figure 18B:
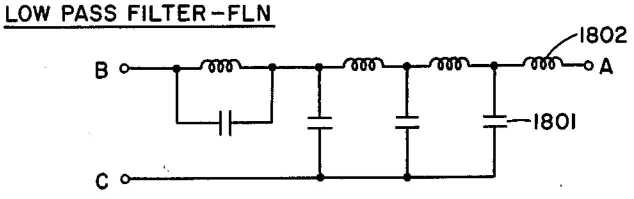

To illustrate the operation of the system, assume that a call has been extended to a called station by a register under control of signals received over the line terminated by line terminating unit 21 and that the calling and called line time position identities have been transferred to the link circuit individually associated with link connector 48, which is shown in Fig. 19C. Under these conditions, pulses in time position 1, the time position permanently assigned to the line terminated by unit 21, are transmitted over conductor CSP–L to link conductor 48 and are utilized to trigger the calling blocking oscillator gates 1913 and 1914 in link connector 48. Blocking oscillator gates 1913 and 1914 are triggered by each negative-going pulse appearing on conductor CSP–L and remain operated for a period of approximately .25 microsecond. Similarly, pulses in the time position of the called unit utilized to extend the connection out of the illustrated long distance switching center to another office or in the time position of a called service line in the illustrated long distance switching center are coupled over conductor TSP–L to link connector 48 and are utilized to trigger the called blocking oscillator gates 1915 and 1916 in link connector 48. Blocking oscillator gates 1915 and 1916 are triggered by the leading edge of each negative-going pulse appearing on conductor TSP–L and also remain operated for a period of approximately .25 microsecond. During time position 1 in each time position frame, blocking oscillator gates 1905 and 1906 of the master gate are operated, blocking oscillator gates 1908 and 1909 of the group 1 gate are operated, blocking oscillator gates 1910 and 1911 of the group 1 subgroup 1 gate have been operated for a period of .25 miscrosecond and will remain operated for .25 microsecond following the termination of the time position channel, and blocking oscillator gates 1901 and 1912 have been operated for 9.25 microseconds and will remain operated for .25 microsecond following the termination of the time position channel. Thus, signals received over the receive conductors of the line terminated by unit 21 have been coupled through gate 1901 to terminal B of low-pass filter 1917, which is common to the ten lines forming the first subgroup of the first group, for 9.25 microseconds preceding time position 1. It will be recalled from the decription of the low-pass filter FLN of Fig. 18 that the end elements of that filter are used in a series resonant circuit for resonant transfer operation. During time position 1 when blocking oscillator gates 1905 and 1906 of the master gate are closed, a series resonant circuit is completed between the end elements of low-pass filter 1917 through blocking oscillator gate 1911, blocking oscillator gate 1909, blocking oscillator gate 1906 to the transmission network conductor send, and through blocking oscillator gate 1913 and inductor 1918 to capacitor 1919. If the period of time the blocking oscillator gate 1906 remains closed is selected to be half the natural resonant period of oscillation of the end elements of filter 1917, inductor 1918, and capacitor 1919, the energy stored in the storage capacitor in filter 1917, shown as capacitor 1801 in Fig. 18B, decreases to zero and the total charge now appears on capacitor 1919 in the link connector 48. During the time position assigned to the called line, energy corresponding to signals appearing on that line is stored in capacitor 1920 in link connector 48 so that during time position 1, the energy stored in that capacitor is transferred through blocking oscillator gate 1914 to the transmission network conductor receive and through blocking oscillator gates 1905, 1908, 1910, and 1912 to the storage capacitor in low-pass filter 1921 in line terminating unit 21.

Similarly, during the time position assigned to the called line, the energy stored in capacitor 1919 during time position 1 is transferred to the low-pass filter corresponding to filter 1921 in the called line terminating unit. The demodulated signal appearing at output terminal B of low-pass filter 1921 is thus a replica of the signal transmitted over the receive conductors of the line terminated by the called unit. The demodulated signal appearing at terminal B of filter 1921 is amplified by amplifier 1922 and applied to the send conductors terminated by unit 21 and which extend either to a distance office or to a service line station.

It will be recalled from the general description that clamp circuit 35, which is shown in Fig. 19A, is utilized to clamp the section of the voice path between the line gates of the first subgroup in the first group of lines and the subgroup gate for that subgroup of lines to ground potential following each operation of the group 1 subgroup 1 gate. It can be seen that each pulse received on conductor G1S1 is amplified by emitter follower 1923, delayed by the delay line comprising inductor 1924, and the trailing edge of the delayed pulse is applied to the C terminals of blocking oscillator gates 1925 and 1926. The trigger pulse is delayed slightly to assure that the blocking oscillator gates 1910 and 1911 in the group 1 subgroup 1 gate have opened before blocking oscillator gates 1925 and 1926 are closed to connect ground from their B terminals to the send and receive conductors of the associated section of the voice path. Blocking oscillator gates 1925 and 1926 are designed to remain operated for a shorter period of time than .25 microsecond to assure that they will be open before the next line gate to be closed is closed.

Clamp circuits 34, 33 and 32 are identical to the just described clamp circuit 35 with the exception that the trigger pulse is applied to the D terminals of the blocking oscillator gates in each of said clamp circuits since said clamp circuits are triggered by the trailing edge of negative-going pulses. The blocking oscillator gates in clamp circuit 34 are triggered by the negative-going pulses appearing on conductor G1G while the blocking oscillator gates in both clamp circuits 33 and 32 are triggered by negative pulses appearing on conductor 2MC.

Figure 20:
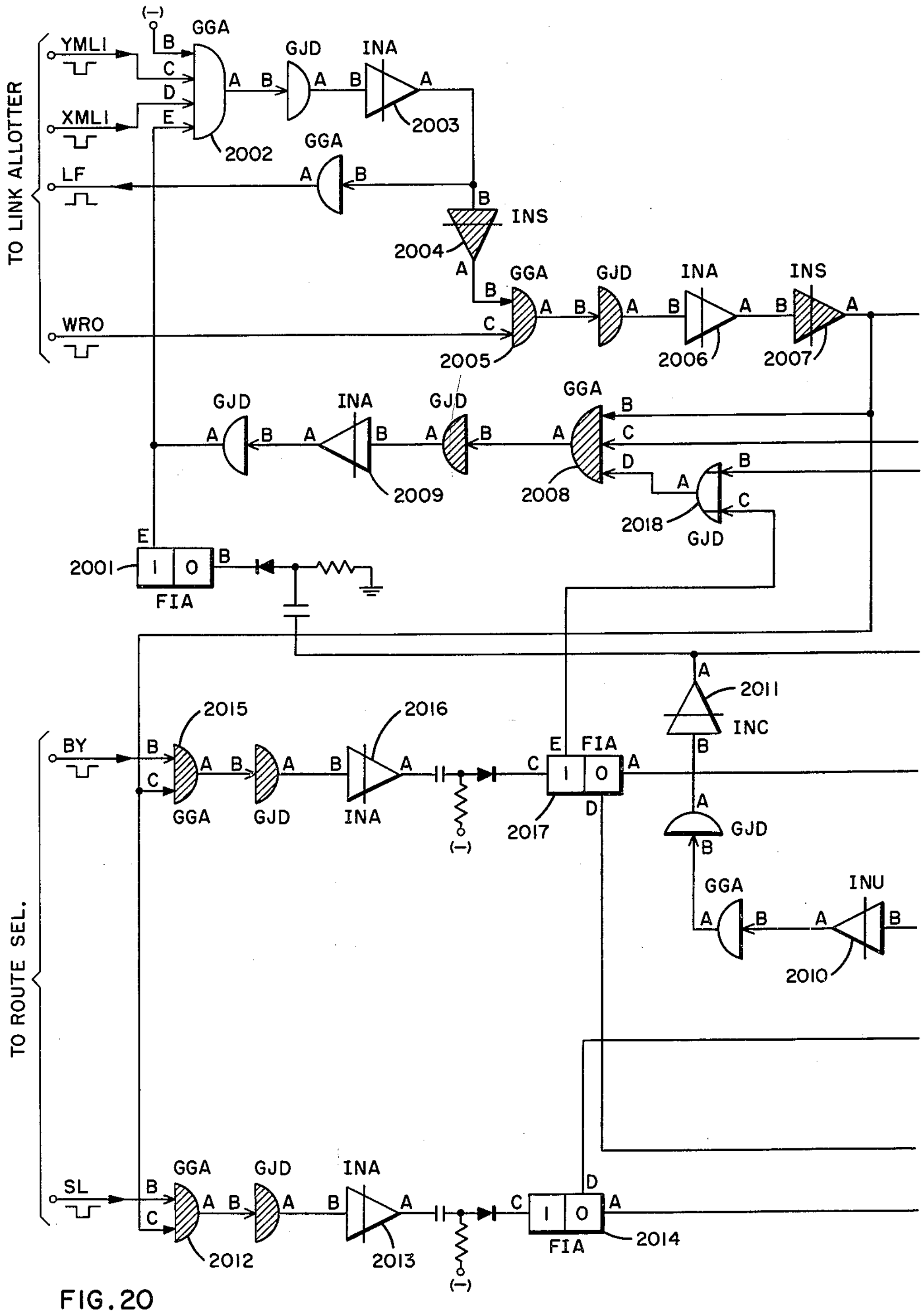
Figure 21:
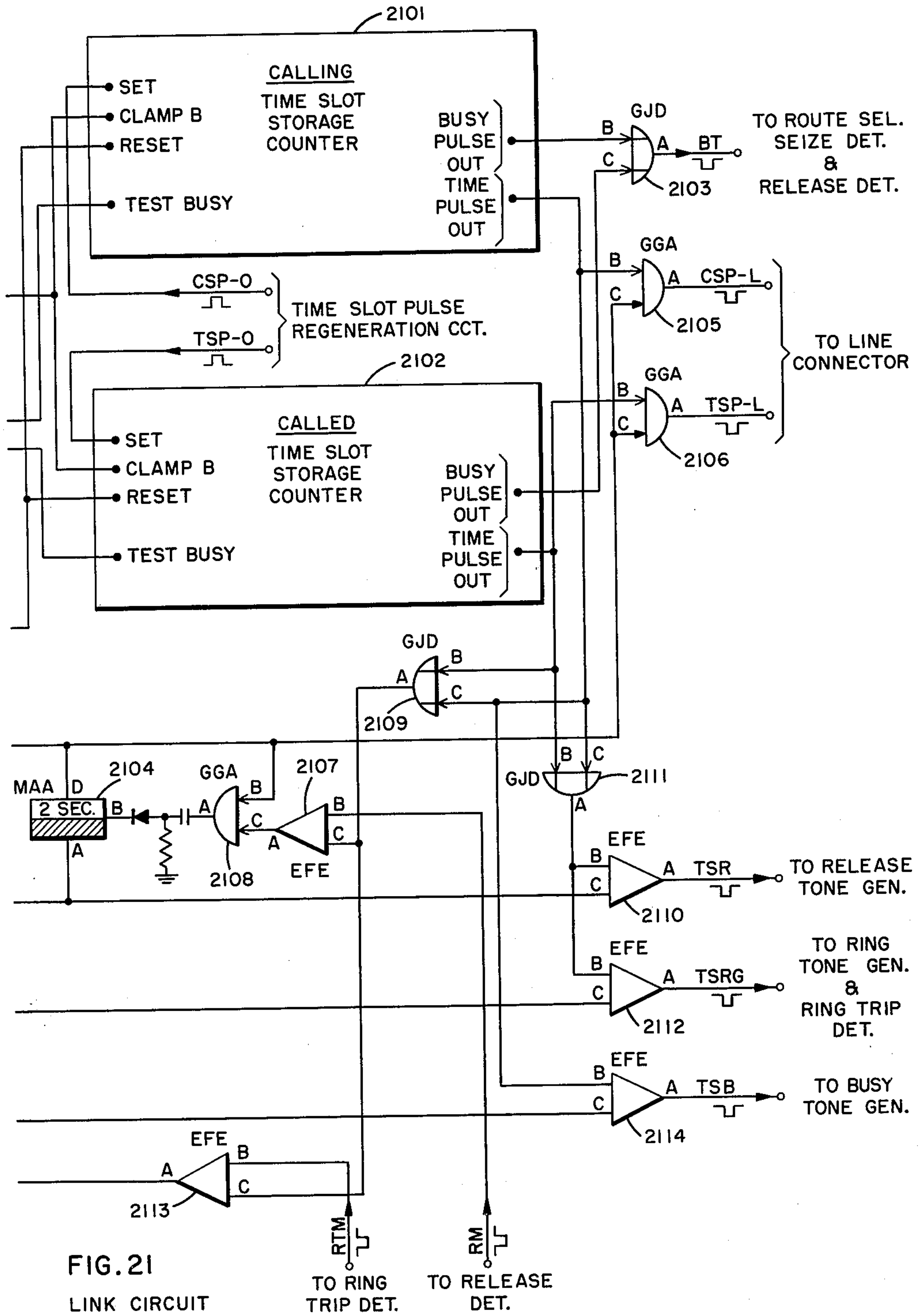

*Link circuit.*—A plurality of link circuits, identical to the one shown in Figs. 20 and 21, is provided in the illustrated system. As previously described, the illustrated system is of the common control type in which only a few registers and a single route selector are provided. The main function of each link circuit is to establish and maintain a connection between calling and called line terminating units involved in a particular call, as denoted by the identification marking received from the common circuits, for the duration of the call between those units. The link circuit comprises a calling time slot storage counter 2101 for storing the time position identity of a calling unit and a called time slot storage counter 2102 for storing the time position identity of a called unit. Time slot storage counters 2101 and 2102 may be identical to the time slot storage counter disclosed in Fig. 47 of the above-identified copending application with the exception that counters 2101 and 2102 must be able to store the identity of any one of two hundred units rather than the identity of any one of thirty-two units. The necessary expansion of the counter circuits is well within the ability of one skilled in the art. As will be described in detail hereinafter, the identification information is retained by the link circuit and the link connector individually associated with the link circuit is controlled in accordance with the identification information stored in the link circuit to maintain a connection between the corresponding units until one of the parties to the connection hangs up.

As fully described in the above-identified application, each link circuit is marked for use by the link allotter by the application of negative potential to the unique combination of one X-marking conductor and one Y-marking conductor corresponding to that link circuit. As shown in Fig. 20, the illustrated link circuit is identified by the X- and Y-marking conductors XML1 and YML1, respectively. If the illustrated link circuit is idle at the time that negative potential is simultaneously applied to conductors XML1 and YML1, flip-flip 2001 is in its reset condition, all inputs to gate 2002 are negative, and amplifiers 2003 and 2004 become conductive. When amplifier 2003 becomes conductive, ground potential is applied to conductor LF which, as described in the above-identified application, serves to terminate the searching operation of the link allotter. Thus, the illustrated link circuit is allotted for use and remains in the just described condition until a negative signal is received on conductor WRO from the route selector, signifying that the allotted link circuit is to read in identification information corresponding to calling and called units. It will be recalled from the general description that if the call is to another long distance switching center or a local office, both calling and called unit identification information is read out of the direct dialing register, while if the call is to a service line, the calling unit identification is read out of the direct dialing register and the called unit identification is read out of the route selector.

Since the operation of the link circuit differs slightly in accordance with whether the call is to a local office or long distance switching center or is to a service line, first assume that the call to be established by the illustrated link circuit is to a line terminating unit which terminates a trunk line to a local office or another long distance switching center. Under these conditions, when negative potential is received on conductor WRO, service line conductor SL remains at ground potential, a negative-to-ground pulse is received on conductor CSP–O of Fig. 21 to identify the time position assigned to the calling unit, and a negative-to-ground pulse is received on conductor TSP–O of Fig. 21 to identify the time position assigned to the called unit.

When negative potential is received on conductor WRO, a negative signal is coupled through gate 2005 since amplifier 2004 is conductive in the allotted link circuit, and amplifiers 2006 and 2007 are rendered conductive. When amplifier 2007 becomes conductive, negative potential is applied to terminals clamp B of calling time slot storage counter 2101 and called time slot storage counter 2102 to enable those counters to read in the time position identity of the calling and called units, respectively. When the time position identities of the calling and called units are read in by counters 2101 and 2102, respectively, negative potential is applied to the test busy terminal of each of said counters and, since amplifier 2007 is conductive, all inputs to gate 2008 are negative and amplifier 2009 is rendered conductive. When amplifier 2009 becomes conductive, flip-flip 2001 is triggered to its set condition and ground potential is applied to terminal E of gate 2002 to render amplifier 2003 non-conductive. When amplifier 2003 becomes non-conductive, negative potential is applied to conductor LF to initiate the release of the register finder, the calling register, and the route selector. The link allotter then preallotts the next idle link circuit for use on the next call. Also when amplifier 2003 becomes non-conductive, amplifiers 2004, 2006, 2007 and 2009 become non-conductive to close the read in gates of the illustrated link circuit.

For the duration of the call, a negative pulse in the time position of the calling unit appears once each frame at terminals busy pulse out and time pulse out of counter 2101 and a negative pulse in the time position of the called unit appears once each frame at terminals busy pulse out and time pulse out of counter 2102. The negative busy pulses in the time position of the calling and called units are coupled through gate 2103 to busy test conductor BT and serve to mark the calling and called units as busy to the seize detector and the route selector. Since monostable multivibrator 2104 is in its reset condition at this time and its terminal D, therefore, stands at a negative potential, the negative pulses in the time position of the calling unit appearing at terminal time pulse out of counter 2101 are coupled through gate 2105 to conductor CSP–L and the negative pulses in the time position of the called unit appearing at terminal time pulse out of counter 2102 are coupled through gate 2106 to conductor TSP–L. As explained in the description of the link connector, the pulses applied to conductor CSP–L serve to trigger the calling blocking oscillator gates and the pulses applied to conductor TSP–L serve to trigger the called blocking oscillator gates in the link connector individually associated with the illustrated link circuit. Thus, a connection is completed between the calling and called units.

When a voice frequency release signal is detected in any one of the time position channels of the transmission network by the release detector, a pulse in that time position is applied to conductor RM by the release detector. In the illustrated circuit, the pulses received over conductor RM are applied to the B terminal of emitter follower 2107. A negative pulse appears at the output of emitter follower 2107 and is coupled through gate 2108 to trigger monostable multivibrator 2104 only if the pulse applied to the B terminal of emitter follower 2107 corresponds in time position to one of the pulses appearing at the time pulse out terminals of counters 2101 and 2102, which pulses are coupled through OR gate 2109 to the C terminal of emitter follower 2107. If the pulse received on conductor RM is in the time position of either the calling or called unit served by the illustrated link circuit, multivibrator 2104 is triggered to its operated condition, its D terminal goes to ground potential to thereby block gates 2105, 2106 and 2108, and its A terminal goes to negative potential to enable emitter follower 2110 to couple pulses in the time positions of the calling and called units served by the illustrated link circuit, which pulses are applied to its B terminal through gate 2111, to conductor TSR, which extends to the release tone generator. Thus, the release tone generator is controlled to apply release tone to the transmission network in the time position channels of the calling and called units for a period of two seconds.

When monostable multivibrator 2104 reverts to its unoperated condition at the termination of the two second interval, amplifier 2010 is triggered conductive for appromixately fifty microseconds by the positive-going voltage transition appearing at terminal A of multivibrator 2104. When amplifier 2010 becomes conductive, amplifier 2011 becomes conductive and the fifty microsecond positive-going pulse appearing at the output of amplifier 2011 is applied to terminal B of flip-flip 2001 and to the reset terminals of counters 2101 and 2102 to reset all of those circuits. When flip-flip 2001 is reset, negative potential is applied to terminal E of gate 2002 so that the illustrated link circuit can be assigned for use on another call.

Assume that the link circuit is again allotted for use so that amplifiers 2003 and 2004 become conductive and that when a negative signal is received on conductor WRO and amplifiers 2006 and 2007 become conductive, a negative signal is also received on conductor SL. A negative signal is applied to conductor SL by the route selector when the called unit terminates a service line so that the allotted link circuit will function to control the ringing of the station associated with that line. When amplifier 2007 becomes conductive, the time positions of the calling and called units are read in, as previously described, and gate 2012 is enabled to pass the negative signal appearing on conductor SL to render amplifier 2013 conductive. When amplifier 2013 becomes conductive, flip-flip 2014 is triggered to its set condition and the negative signal appearing at its terminal D enables emitter follower 2112 to couple the time position pulses in the time positions of the calling and called units received through gate 2111 to conductor TSRG. The pulses applied to conductor TSRG control the ringing tone generator to apply ringing tone to the transmission network in the time positions of the calling and called units and also control the ring trip detector to scan those channels for ring trip signals. The ringing tone coupled to the calling unit is used as a ringback tone, while the ring tone coupled to the called unit is used as a ringing signal at the station coupled to the line terminated by the called unit.

When a voice frequency ring trip signal is detected in any one of the time position channels of the transmission network by the ring trip detector, a pulse in that time position is applied to conductor RTM. In the illustrated circuit, pulses received over conductor RTM are applied to the B terminal of emitter follower 2113. A negative pulse appears at the output of emitter follower 2113 to reset flip-flip 2014 only if the pulse applied to the B terminal of emitter follower 2113 corresponds in time position to the pulses in the time position of the called unit appearing at terminal time pulse out of counter 2102 and coupled to terminal C of emitter follower 2113. If the pulse received over conductor RTM is in the time position of the called unit served by the illustrated link circuit, flip-flip 2014 is reset and the ground potential appearing at its terminal D blocks emitter follower 2112 from coupling further pulses to conductor TSRG. Thus, the ringing is tripped or terminated. Subsequent operation in the illustrated link circuit is exactly the same as described for a call to a local office or another long distance switching center.

If the busy test made by the route selector shows that the called service line is busy or that all trunk lines in a called group are busy, negative potential is applied to conductor BY simultaneously with the application of negative potential to conductor WRO. Under these conditions, a negative signal is coupled through gate 2015, amplifier 2106 becomes conductive, and flip-flip 2017 is triggered to its set condition. When flip-flip 2017 is set and its terminal B goes negative, emitter follower 2114 is enabled to couple the negative pulses in the time position of the calling unit to conductor TSB. Also when flip-flip 2017 is set, amplifier 2009 becomes conductive through gates 2018 and 2008 to set flip-flip 2001. The inclusion of gate 2018 in the circuit is necessary since a pulse is not coupled to conductor TSP–O to identify a called unit when a busy condition exists. The pulses on conductor TSB control the busy tone generator to couple busy tone to the transmission network in the time position channel assigned to the calling unit. When a voice frequency release signal is detected in the time position channel of the calling unit, monostable multivibrator 2104 is controlled to generate a two second pulse and release tone is transmitted in the time position channel of the calling unit, as previously described. Also when multivibrator 2104 is operated, flip-flip 2017 is reset. When multivibrator 2104 restores to its unoperated condition, amplifiers 2010 and 2011 become conductive for approximately fifty microseconds and flip-flip 2001 and counter 2101 are reset, all as previously described.

Figure 22:
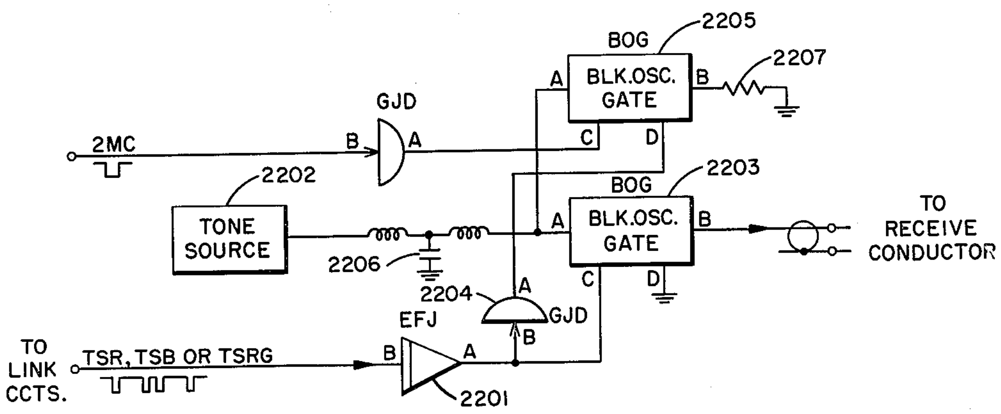

*Tone generator.*—The tone generator, shown in Fig. 22, may be used as either a release, busy, or ringing tone generator. When the illustrated circuit is used as a release tone generator, conductor TSR, which carries negative pulses in the time positions of both calling and called units, is connected to terminal B of emitter follower 2201 and tone source 2202 may be any suitable source of the compound release signal frequencies 2100 and 2900 c.p.s. When the illustrated circuit is used as a busy tone generator, conductor TSB, which carries negative pulses in the time position of calling units, is connected to terminal B of emitter follower 2201 and tone source 2202 may be any suitable source of busy tone signals, such as one-half second On, one-half second Off 600 c.p.s. And finally, whn the illustrated circuit is used as a ringing tone generator, conductor TSRG, which carries negative pulses in the time positions of calling and called units which are to be rung, is connected to terminal B of emitter follower 2201 and tone source 2202 may be any suitable source of ringing tone signals, such as one second On, two seconds Off 600 c.p.s. It should be apparent that in any pulse there may be a number of time position defining pulses amplified by emitted follower 2201 and applied to terminal C of blocking oscillator gate 2203 and through diode 2204 to terminal D of blocking oscillator gate 2205.

During the guard time between each pair of successive time position channels, energy from tone source 2202 is stored in capacitor 2206. If a negative pulse appears at the output of emitter follower 2201 in a particular time position channel, blocking oscillator gate 2203 is triggered to its operated condition for a period of approximately .25 microsecond and the energy stored in capacitor 2206 is transferred over the transmission network receive conductor to the receiving low-pass filter in the line terminating unit assigned that particular time position channel. Blocking oscillator gate 2205 is not triggered when a negative pulse is amplified by emitter follower 2201 and applied to its terminal D since its terminal C is simultaneously made negative by the time position defining pulse received over conductor 2MC. However, in each time position channel in which a pulse is not received over the input conductor TSR, TSB, or TSRG, as the case may be, the output of emitter follower 2201 remains at ground potential and blocking oscillator gate 2205 is triggered by the 2MC pulse to discharge capacitor 2206 through gate 2205 and resistor 2207 to ground potential. Blocking oscillator gate 2205 is included in the system for the purpose of providing uniform loading of the tone source 2202.

Figure 23:
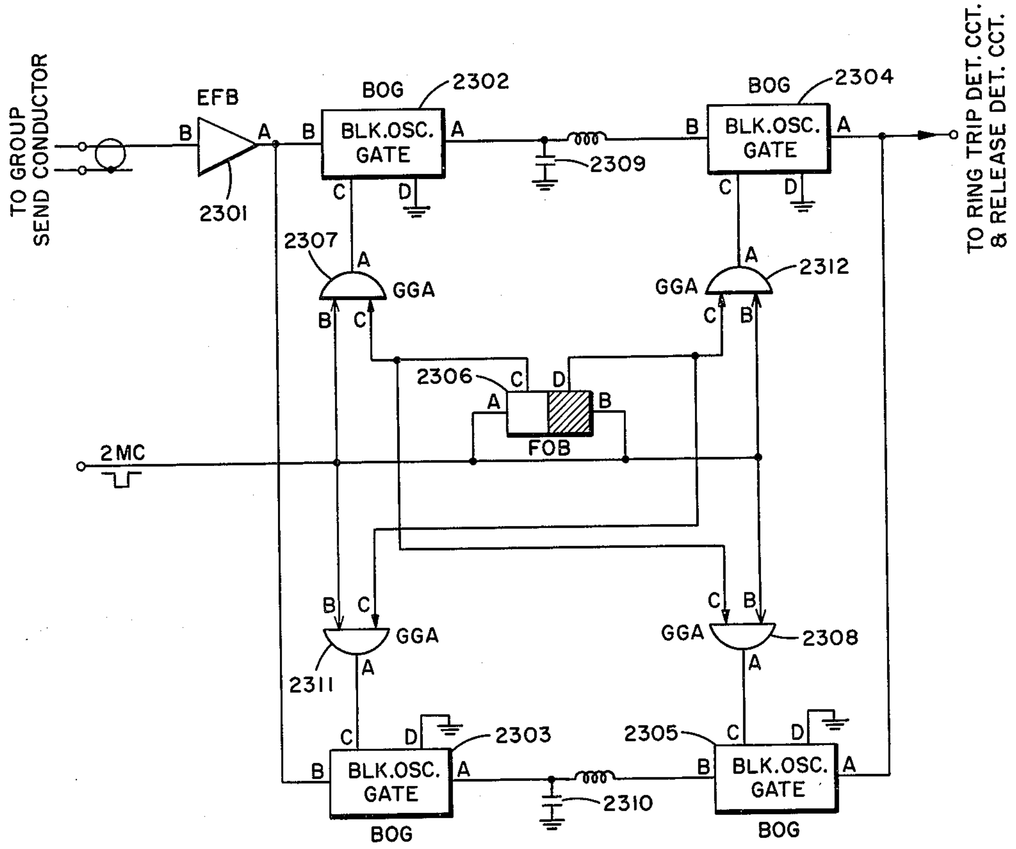

*Read-off circuit.*—The read-off circuit, shown in Fig. 23, is used in the illustrated system to couple the ring trip and release detector circuits to the transmission network and may also be used to couple an operator's position to said network in systems where an operator's position is provided. The input of high input impedance emitter follower 2301 is coupled to the group send conductor so that a very small portion of the energy appearing in each time position channel is amplified by emitter follower 2301 and applied to the B terminals of blocking oscillator gates 2302 and 2303. Blocking oscillator gates 2302, 2303, 2304 and 2305 are operated in pairs as controlled by flip-flop 2306, which is triggered by the trailing edge of each time position defining pulse received on conductor 2MC. When flip-flop 2306 is in the condition shown, its terminal C is negative and gates 2307 and 2308 are thereby enabled to pass the next occurring negative-going pulse on conductor 2MC to trigger blocking oscillator gates 2302 and 2305. When blocking oscillator gates 2302 and 2305 are closed, energy diverted from the transmission network and amplified by emitter follower 2301 is stored in capacitor 2309 and energy previously stored in capacitor 2310 is transmitted over conductor SS to a low-pass filter in either the ring trip or release detector circuits. At the termination of the pulse which triggers blocking oscillator gates 2302 and 2305, flip-flop 2306 is triggered to the condition in which its terminal D is negative and gates 2311 and 2312 are thereby enabled to pass the next occurring negative 2MC pulse to trigger blocking oscillator gates 2303 and 2304. When blocking oscillator gates 2303 and 2304 are closed, energy diverted from the transmission network and amplified by emitter follower 2301 is stored in capacitor 2310, and the energy stored in capacitor 2309 during the preceding time position channel is transmitted over conductor SS to the release and ring trip detector circuits. Thus, it can be seen that energy stored in the read-off circuit during each time position channel is transmitted to the release and ring trip detector circuits over conductor SS in the next succeeding time position channel.

Figure 24:
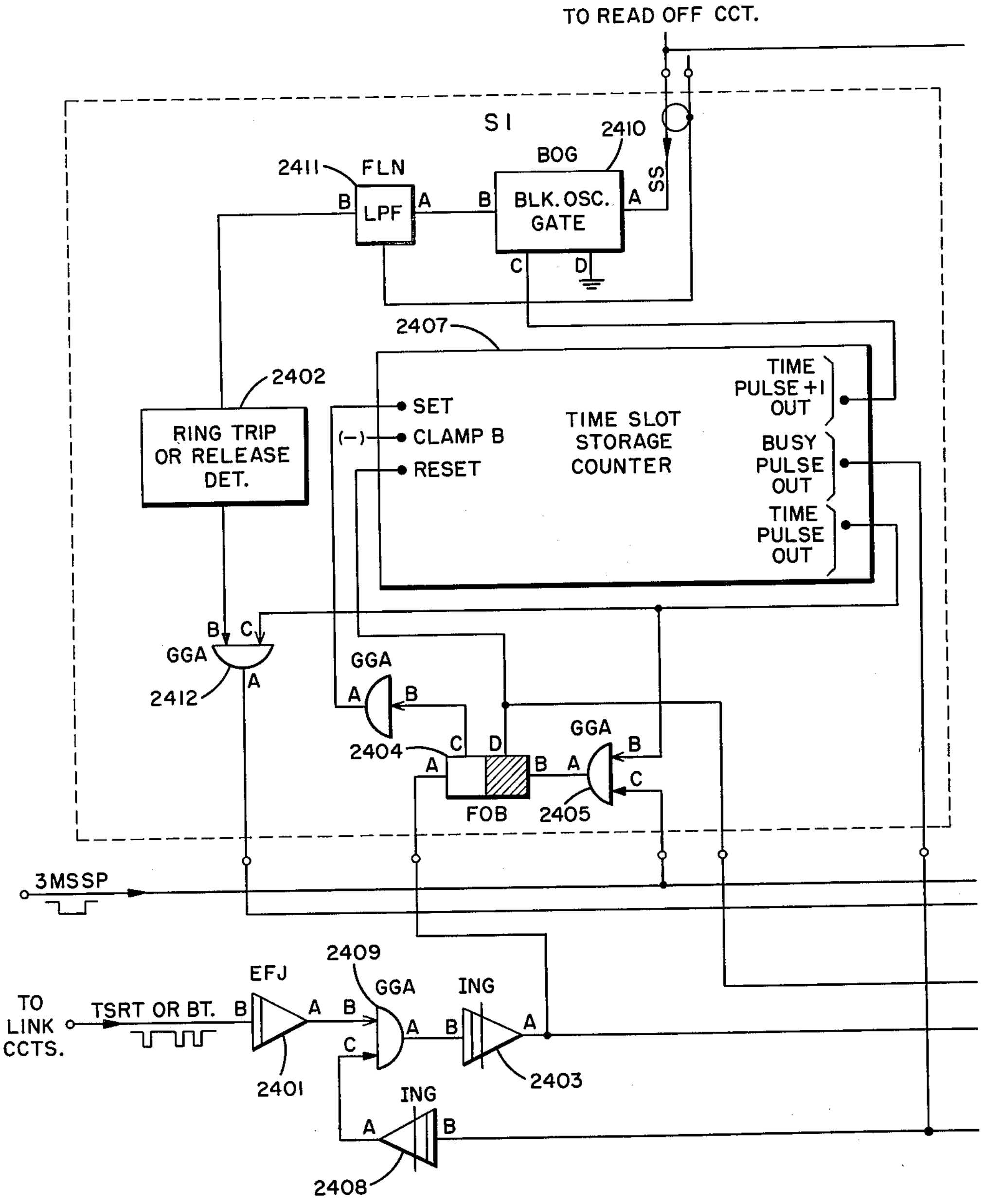
Figure 25:
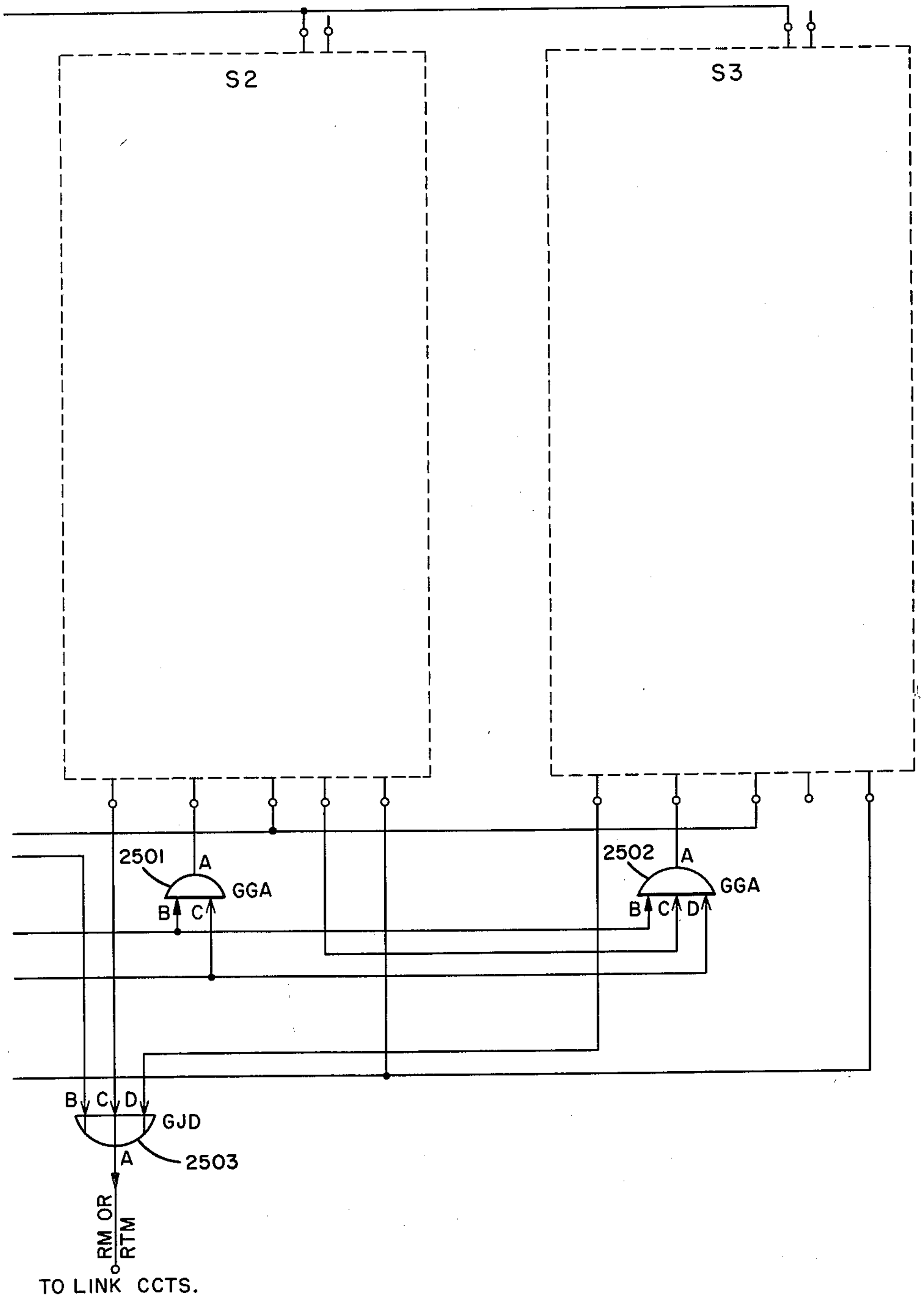
Figure 26:
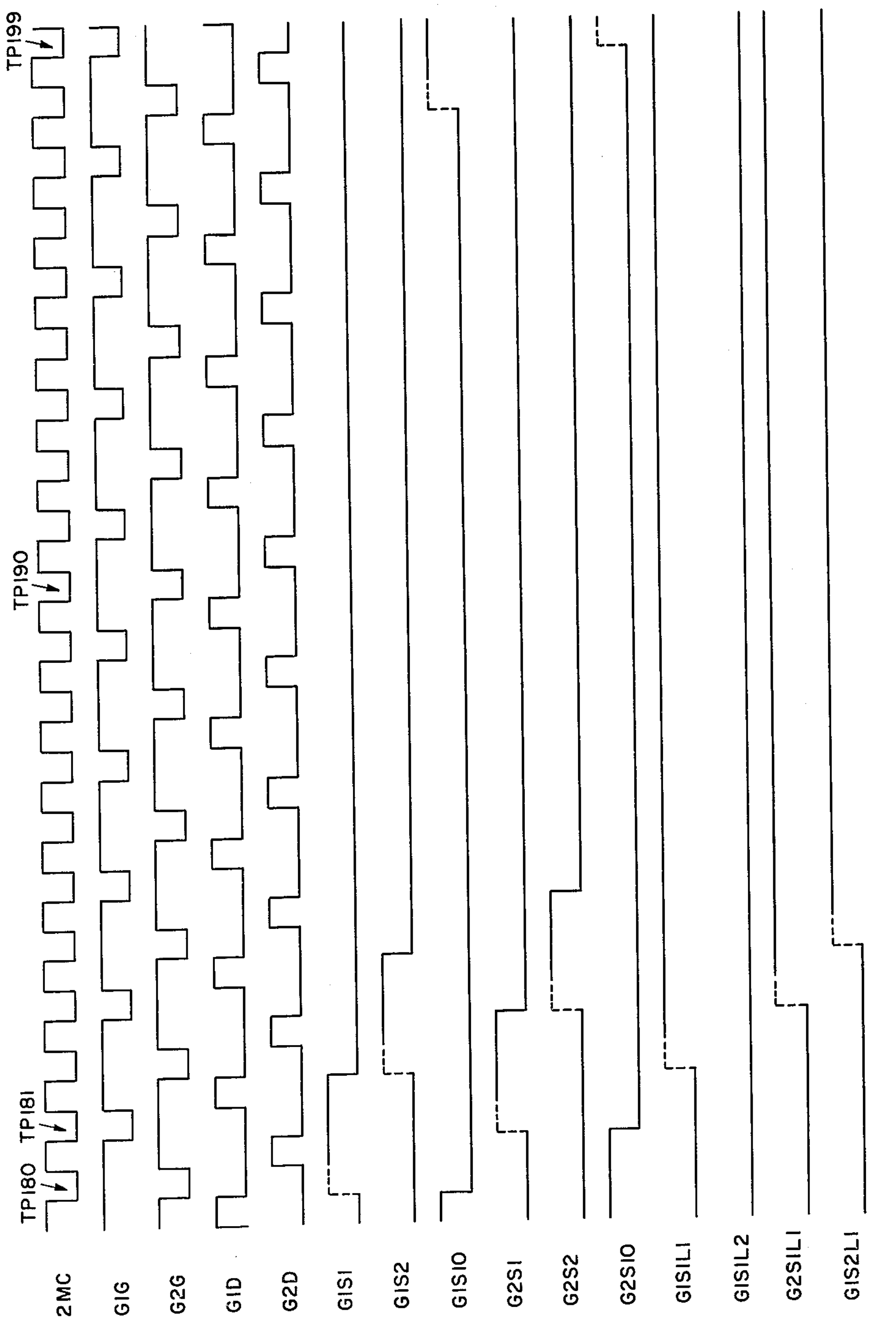
Figure 27:
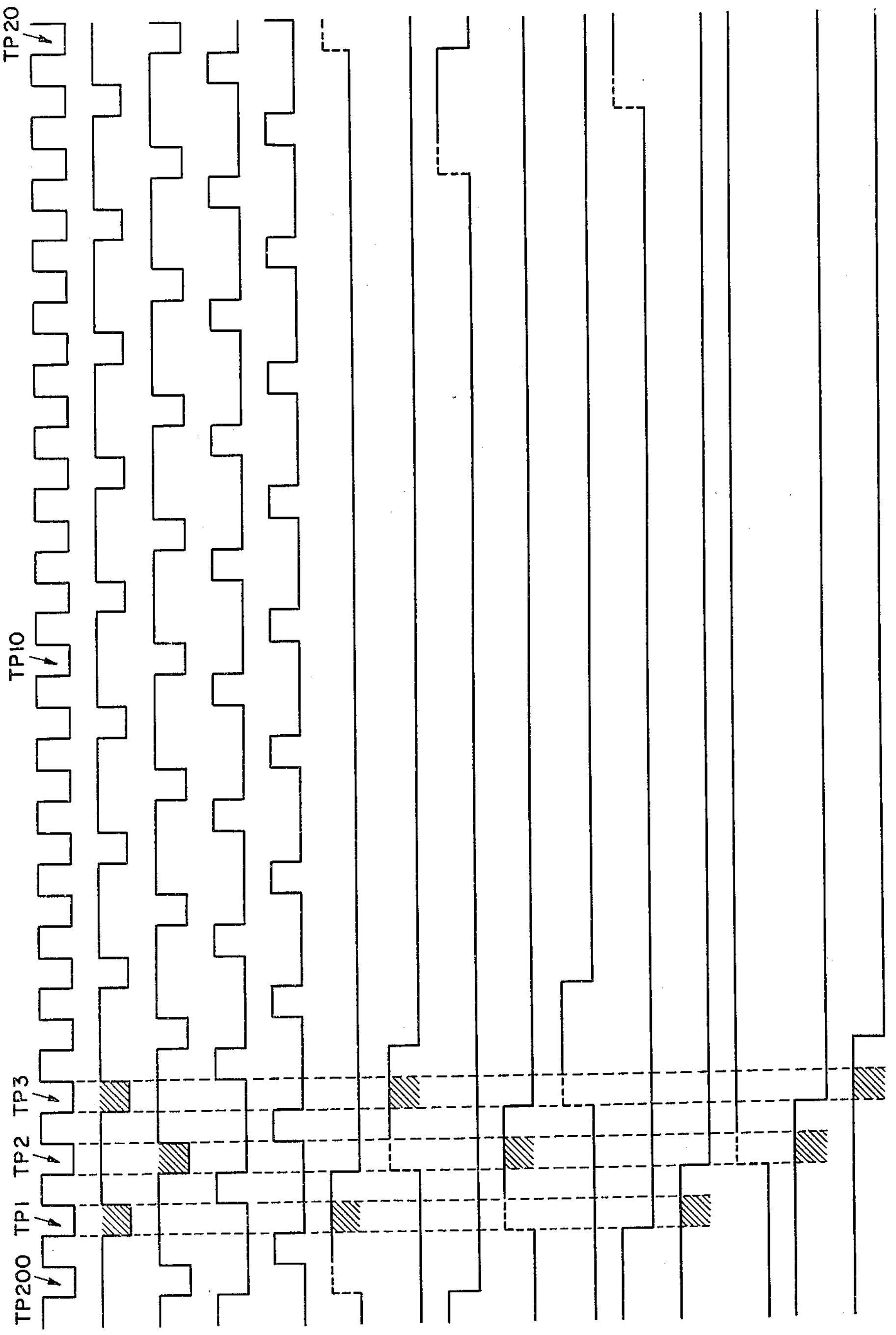

*Detector circuit.*—The detector circuit, which is shown in Figs. 24 and 25, may be used as either a ring trip detector circuit or a release detector circuit. If the illustrated circuit is used as a ring trip detector, conductor TSRG, which carries negative pulses in the time position channels of calling and called units which are receiving ringing tone, is connected to terminal B of emitter follower 2401 and voice frequency signal detector 2402 in each of the stages S1–S3 is tuned to detect a ring trip signal. If the illustrated circuit is used as a release detector circuit, conductor BT, which carries negative pulses in the time position channels of busy units, is connected to terminal B of emitter follower 2401 and voice frequency signal detector 2402 in each of the stages S1–S3 is tuned to detect a compound voice frequency release signal. The illustrated circuit comprises three stages S1–S3 so that three channels may be scanned simultaneously.

As will be described more fully hereinafter, three channels are scanned for three milliseconds and then three other channels, if there are three or more additional channels awaiting attention, are scanned during the next three millisecond period.

To illustrate the operation of the detector circuit, assume that stages S1–S3 are idle and that a pulse in time position 200 is applied to terminal B of emitter follower 2401. The amplified pulse appearing in time position 200 at the output of emitter follower 2401 renders amplifier 2403 conductive and flip-flop 2404 in stage S1 is triggered to its set condition. The flip-flop corresponding to flip-flop 2404 in stage S2 is not triggered to its set condition by that pulse since gate 2501 is blocked by ground potential appearing at terminal D of flip-flop 2404 in stage S1. When flip-flop 2404 is set, the output of gate 2501 remains at ground because of the pulse applied to its terminal C. At the termination of the pulse from amplifier 2403, the output of gate 2405 goes negative and gate 2405 is thereby enabled to pass the next occurring pulse from amplifier 2403. Similarly, gate 2502 is enabled only after the flip-flop 2404 in each of the stages S1 and S2 is set.

Returning to the consideration of stage S1, it can be seen that when flip-flop 2404 is triggered to its set condition, a positive-going pulse is applied to the set terminal of time slot storage counter 2407 and time position 200 is thereby memorized by the counter 2407. Time slot storage counter 2407 may be identical to the counter shown in Fig. 47 of the above-identified application but has its count increased from thirty-two to two hundred and also has provision for gating out a time position pulse in the time position immediately succeeding the time position in which it was set. In the assumed case, a pulse appears at terminals time pulse out and busy pulse out in time position 200 during each pulse frame succeeding the pulse frame during which it was set. The pulse appearing at terminal busy pulse out is amplified and inverted by amplifier 2408 and used to block gate 2409 during that time position so that the same time position pulse cannot be read into more than one stage. Also in the assumed case, a pulse in time position 1 appears at terminal time pulse +1 out and is utilized to trigger blocking oscillator gate 2410. It will be recalled from the description of the read-off circuit that signals appearing in any particular time position channel on the transmission network appear in the next succeeding time position on conductor SS. Therefore, the signals appearing on conductor SS in time position 1 and which are coupled through blocking oscillator gate 2410 to low-pass filter 2411 correspond to the signals appearing in time position 200 on the transmission network.

The demodulated signals appearing at terminal B of low-pass filter 2411 are coupled to the signal detector 2402 and when a release or ring trip signal, depending upon the application of the illustrated circuit, is detected by the detector, a negative potential is applied to terminal B of gate 2412 and gate 2412 is thereby enabled to pass the time position pulse identifying the scanned channel through gate 2503 to conductor RM or RTM, again depending upon the application of the illustrated circuit. Thus, the channel on which a release or ring trip signal is detected is identified by a pulse in its time position which is transmitted to the link circuits. At the end of each three millisecond period, a one hundred microsecond negative pulse is received on conductor 3MSSP, and during time position 200, both inputs to gate 2405 go negative so that when the output of gate 2405 returns to ground potential at the termination of the pulse in time position 200, which is applied to its terminal B, flip-flop 2404 is reset. When flip-flop 2404 is reset, ground potential is applied to the reset terminal of counter 2407 and the counter is thereby returned to its reset condition.

To illustrate how the illustrated circuit scans channels in turn, assume that stage 1 has been controlled to connect to channel 200, stage 2 has been controlled to connect to channel 1, stage 3 has been controlled to connect to channel 2, a signal has not been detected on any of said channels, and that channels 4 and 5 are marked on the input conductor as awaiting service. At the end of a three millisecond timed period, a one hundred microsecond negative pulse appears on conductor 3MSSP coincident with the beginning of the one hundred microsecond frame period. During time position 1, a negative output is realized from the gate corresponding to 2405 in stage S2 and at the termination of that pulse, flip-flop 2404 in stage S2 is reset. Similarly, the flip-flop corresponding to 2404 in stage S3 is reset at the termination of time position channel 2. During time position 4, a positive-going pulse appears at the output of amplifier 2403 and the time slot storage counter corresponding to 2407 in stage S2 is controlled to read in that time position and to produce a pulse in that time position in all subsequent pulse frames for the next three millisecond time interval. Similarly, stage S3 is controlled to read in the pulse in time position 5. At the termination of time position channel 200, stage S1 is reset and during the next pulse frame reads in the pulse in time position 1. Thus, the detector circuit disconnects from the channels previously scanned and connects to channels awaiting attention.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a communication system, a plurality of groups of lines, each of said groups of lines divided into a plurality of subgroups of lines, a transmission network of the time position channel type, a master gate, a group gate for each group of lines, a subgroup gate for each subgroup of lines, a line gate for each line, means for interposing in an individual connection between each line and said transmission network the line gate for that line, the subgroup gate for that line, the group gate for that line, and said master gate, each of said gates being operable to complete a connection therethrough, means for developing a train of time position defining pulses individually corresponding to the time position channels of said network, means controlled by said time position defining pulses for operating said master gate, means controlled by said time position defining pulses for developing trains of group pulses with the pulses in each train of group pulses occurring at a submultiple of the frequency of said time position defining pulses, means controlled by each of said trains of group pulses for operating an individual one of said group gates, means controlled by each of said trains of group pulses for developing trains of subgroup pulses occurring at a submultiple of the frequency of said group pulses, means controlled by each of said trains of subgroup pulses for operating an individual one of said subgroup gates, means controlled by each of said trains of subgroup pulses for developing trains of line pulses with the pulses in each train of line pulses occurring at a submultiple of the frequency of said subgroup pulses, and means controlled by each of said trains of line pulses for operating an individual one of said line gates.

2. The system of claim 1 including means for controlling said master gate operating means to operate said master gate for a shorter period of time than the period of time for which any of the others of said gates are operated.

3. In a communication system, a plurality of groups of lines, each of said groups of lines divided into a plurality of subgroups of lines, a transmission network of the time position channel type, a master gate, a group gate for each group of lines, a subgroup gate for each subgroup of lines, a line gate for each line, means for interposing in an individual connection between each line and said transmission network the line gate for that line, the subgroup gate for that line, the group gate for that line, and said master gate, each of said gates being operable to complete a connection therethrough, means for developing a train of time position defining pulses individually corresponding to the time position channels of said network, means controlled by said time position defining pulses for operating said master gate, means controlled by said time position defining pulses for developing time interlaced trains of group pulses with the pulses in each train of group pulses occurring at a submultiple of the frequency of said time position defining pulses, means controlled by each train of group pulses for operating an individual one of said group gates, means controlled by each train of group pulses for developing time interlaced trains of subgroup pulses with the pulses in each train of subgroup pulses occurring at a submultiple of the frequency of said group pulses, means controlled by each train of subgroup pulses developed under control of the train of group pulses utilized to control the operation of the group gate for each group of lines for operating an individual one of the subgroup gates for the lines in that group, means controlled by each train of subgroup pulses for developing time interlaced trains of line pulses with the pulses in each train of line pulses occurring at a submultiple of the frequency of said subgroup pulses, and means controlled by each train of line pulses developed under control of the train of subgroup pulses utilized to control the operation of the subgroup gate for each subgroup of lines for operating an individual one of the line gates for the lines in that subgroup.

4. The system of claim 3 including means for controlling said master gate operating means to operate said master gate for a shorter period of time than the period of time for which any of the others of said gates are operated.

5. In a communication system, a plurality of groups of lines, each of said groups of lines divided into a plurality of subgroups of lines, a transmission network of the time position channel type, a master gate, a group gate for each group of lines, a subgroup gate for each subgroup of lines, a low-pass filter for each subgroup of lines, means for interposing in an individual connection between each subgroup of lines and said transmission network the filter for that subgroup of lines, the subgroup gate for that subgroup of lines, the group gate for that group of lines, and said master gate, each of said gates being operable to complete a connection therethrough, means for operating said master gate during each of said time position channels, means for operating said group gates at a submultiple of the frequency of operation of said master gate, means for operating said subgroup gates at a submultiple of the frequency of operation of said group gates, and means for connecting in turn each of the lines in each subgroup of lines to the filter for that subgroup of lines for the period of time between successive operations of the subgroup gate for that subgroup of lines.

6. The system of claim 5 wherein said last named means comprises a line gate for each line interposed in a connection between that line and the filter for that subgroup of lines.

7. The system of claim 6 including means for controlling said master gate operating means to operate said master gate for a shorter period of time than the period of time for which any of the others of said gates are operated.

8. In a communication system, a plurality of groups of lines, each of said groups of lines divided into a plurality of subgroups of lines, a transmission network of the time division channel type, a master gate, a group gate for each group of lines, a subgroup gate for each subgroup of lines, a low-pass filter for each subgroup of lines, means for interposing in an individual connection between each subgroup of lines and said transmission network the filter for that subgroup of lines, the subgroup gate for that subgroup of lines, the group gate for that group of lines, and said master gate, each of said gates being operable to complete a connection therethrough, means for operating said master gate during each of said time position channels, means for operating said group gates in succession during successive operations of said master gate in a repeating sequence, means for operating the subgroup gates for each group of lines at a submultiple of the frequency of operation of the group gate for that group of lines, and means for connecting in turn each of the lines in each subgroup of lines to the filter for that subgroup of lines for the period of time between successive operations of the subgroup gate for that subgroup of lines.

9. The system of claim 8 wherein said last named means comprises a line gate for each line interposed in a connection between that line and the filter for that subgroup of lines.

10. The system of claim 9 including means for controlling said master gate operating means to operate said master gate for a shorter period of time than the period of time for which any of the others of said gates are operated.

11. In a communication system, a group of lines divided into subgroups, a transmission network, a group gate, a subgroup gate for each subgroup of lines, a low-pass filter for each subgroup of lines, means for interposing in an individual connection between each subgroup of lines and said transmission network the filter for that subgroup of lines, the subgroup gate for that subgroup of lines, and said group gate, each of said gates being operable to complete a connection therethrough, means for developing a train of group pulses, means controlled by said group pulses for operating said group gate, means controlled by said group pulses for developing time interlaced trains of subgroup pulses with the pulses in each train of subgroup pulses occurring at a submultiple of the frequency of said group pulses, means controlled by each train of subgroup pulses for operating an individual one of said subgroup gates, and means for connecting in turn each of the lines in each subgroup of lines to the filter for that subgroup of lines for the period of time between successive operations of the subgroup gate for that subgroup of lines.

12. The system of claim 11 wherein said last named means comprises a line gate for each line interposed in a connection between that line and the filter for that subgroup of lines, means controlled by each train of subgroup pulses for developing time interlaced trains of line pulses with the pulses in each train of line pulses occurring at a submultiple of the frequency of said subgroup pulses, and means controlled by each train of line pulses developed under control of the train of subgroup pulses utilized to control the operation of the subgroup gate for each subgroup of lines to operate an individual one of the line gates for the lines in that subgroup.

13. In a communication system, a plurality of groups of lines, each of said groups of lines divided into a plurality of subgroups of lines, a transmission network of the time position channel type, a master gate, a group gate for each group of lines, a subgroup gate for each subgroup of lines, a low-pass filter for each subgroup of lines, means for interposing in an individual connection between each subgroup of lines and said transmission network the filter for that subgroup of lines, the subgroup gate for that subgroup of lines, the group gate for that group of lines, and said master gate, each of said gates being operable to complete a connection therethrough, means for developing a train of time position defining pulses individually corresponding to the time position channels of said network, means controlled by said time position defining pulses for operating said master gate, means controlled by said time position defining pulses for developing time interlaced trains of group pulses with the pulses in each train of group pulses occurring at a submultiple of the frequency of said time position defining pulses, means controlled by each train of group pulses for operating an individual one of said group gates, means controlled by each train of group pulses for developing time interlaced trains of subgroup pulses with the pulses in each train of subgroup pulses occurring at a submultiple of the frequency of said group pulses, means controlled by each train of subgroup pulses developed under control of the train of group pulses utilized to control the operation of the group gate for each group of lines for operating an individual one of the subgroup gates for the lines in that group, and means for connecting in turn each of the lines in each subgroup of lines to the filter for that subgroup of lines for the period of time between successive operations of the subgroup gate for that subgroup of lines.

14. The system of claim 13 wherein said last named means comprises a line gate for each line interposed in a connection between that line and the filter for that subgroup of lines, means controlled by each train of subgroup pulses for developing time interlaced trains of line pulses with the pulses in each train of line pulses occurring at a submultiple of the frequency of said subgroup pulses, and means controlled by each train of line pulses developed under control of the train of subgroup pulses utilized to control the operation of the subgroup gate for each subgroup of lines to operate an individual one of the line gates for the lines in that subgroup.

15. The system of claim 14 including means for controlling said master gate operating means to operate said master gate for a shorter period of time than the period of time for which any of the others of said gates are operated.

References Cited in the file of this patent

UNITED STATES PATENTS 2,877,304 Hagenhaus ---------------- Mar. 10, 1959